(12) United States Patent
Abbott et al.

(10) Patent No.: US 7,369,462 B2
(45) Date of Patent: May 6, 2008

(54) WIRELESS SYNCHRONOUS TIME SYSTEM WITH SOLAR POWERED TRANSCEIVER

(75) Inventors: Mark A. Abbott, Delavan, WI (US); Jerald M. Cayo, Jr., Belvidere, IL (US); Darrel L. Thompson, Algonquin, IL (US); Derek J. Brykowski, Cary, IL (US); Terrence J. O'Neill, Lake Geneva, WI (US); James F. Stoffer, Delafield, WI (US)

(73) Assignee: Quartex, Division of Primex, Inc., Lake Geneva, WI (US)

( * ) Notice: Subject to any disclaimer, the term of this patent is extended or adjusted under 35 U.S.C. 154(b) by 316 days.

(21) Appl. No.: 11/236,439

(22) Filed: Sep. 27, 2005

(65) Prior Publication Data

US 2006/0058926 A1    Mar. 16, 2006

Related U.S. Application Data

(63) Continuation-in-part of application No. 11/086,860, filed on Mar. 22, 2005, now abandoned, which is a continuation-in-part of application No. 10/979,049, filed on Nov. 2, 2004, which is a continuation-in-part of application No. 10/876,767, filed on Jun. 25, 2004, which is a continuation of application No. 10/094,100, filed on Mar. 8, 2002, now abandoned, which is a continuation of application No. 09/960,638, filed on Sep. 21, 2001, now Pat. No. 6,873,573.

(60) Provisional application No. 60/613,865, filed on Sep. 28, 2004.

(51) Int. Cl.
*G04B 47/06* (2006.01)
*G04B 19/22* (2006.01)
*G04C 11/00* (2006.01)

(52) U.S. Cl. .............................. 368/47; 368/11; 368/46
(58) Field of Classification Search .................. 368/10, 368/11, 46, 47
See application file for complete search history.

(56) References Cited

U.S. PATENT DOCUMENTS 3,643,420 A    2/1972    Haydon (Continued)

OTHER PUBLICATIONS

Lat-Lon Webpage, Technology, http://web.archive.org/web/20041011104328/http://www.lat-lon.com/technology.html, Oct. 11, 2004.

(Continued)

*Primary Examiner*—Vit W Miska
(74) *Attorney, Agent, or Firm*—Michael Best & Friedrich LLP

(57) ABSTRACT

A primary device for a synchronous event system. In one construction, the primary device includes a solar panel operable to convert light into electricity; a receiver operable to receive a global positioning system time signal; a processor coupled to the receiver and operable to process the global positioning system time signal to produce a processed time component; a internal clock coupled to the processor and operable to store the processed time component and to increment relative to the processed time component thereafter to produce an internal time; and a transmitter coupled to the processor and operable to transmit the internal time to a secondary device for wireless reception by the secondary device and synchronization of the secondary device relative to the primary device.

14 Claims, 16 Drawing Sheets

U.S. PATENT DOCUMENTS

| | | |
|---|---|---|
| 3,681,914 A | 8/1972 | Loewengart |
| 3,690,059 A | 9/1972 | Haydon |
| 3,756,012 A | 9/1973 | Kiss |
| 3,811,265 A | 5/1974 | Cater |
| 3,998,043 A | 12/1976 | Tamaru et al. |
| 4,023,344 A | 5/1977 | Mukaiyama |
| 4,177,454 A | 12/1979 | Shinoda et al. |
| 4,182,110 A | 1/1980 | Kamiwaki et al. |
| 4,395,135 A | 7/1983 | Frantz |
| 4,490,050 A | 12/1984 | Singhi |
| 4,525,685 A | 6/1985 | Hesselberth et al. |
| 4,536,093 A | 8/1985 | Yoshida |
| 4,582,434 A | 4/1986 | Plangger et al. |
| 4,622,557 A | 11/1986 | Westerfield |
| 4,677,541 A | 6/1987 | Singhi |
| 4,695,168 A | 9/1987 | Meister et al. |
| 4,702,613 A | 10/1987 | Ohtawa |
| 4,763,309 A | 8/1988 | Descombes |
| 4,920,365 A | 4/1990 | Marx et al. |
| 4,953,149 A | 8/1990 | Marvosh |
| 4,956,826 A | 9/1990 | Coyman et al. |
| 5,089,814 A | 2/1992 | DeLuca et al. |
| 5,119,341 A | 6/1992 | Youngberg |
| 5,160,853 A | 11/1992 | Simon et al. |
| 5,274,545 A | 12/1993 | Allan et al. |
| 5,282,180 A | 1/1994 | Burke et al. |
| 5,287,109 A | 2/1994 | Hesse |
| 5,293,355 A | 3/1994 | Widen et al. |
| 5,297,120 A | 3/1994 | Yuzuki et al. |
| 5,319,374 A | 6/1994 | Desai et al. |
| 5,375,018 A | 12/1994 | Klausner et al. |
| 5,387,903 A | 2/1995 | Cutter et al. |
| 5,425,004 A | 6/1995 | Staffan |
| 5,440,559 A | 8/1995 | Gaskill |
| 5,442,599 A | 8/1995 | Burke et al. |
| 5,510,797 A | 4/1996 | Abraham et al. |
| 5,521,887 A | 5/1996 | Loomis |
| 5,594,430 A | 1/1997 | Cutter et al. |
| 5,617,375 A | 4/1997 | Bauman et al. |
| 5,661,700 A | 8/1997 | Weppler |
| 5,677,895 A | 10/1997 | Mankovitz |
| 5,717,661 A | 2/1998 | Poulson |
| 5,805,530 A | 9/1998 | Youngberg |
| 5,859,595 A | 1/1999 | Yost |
| 5,889,736 A | 3/1999 | Fujita et al. |
| 5,982,147 A | 11/1999 | Anderson |
| 6,018,229 A | 1/2000 | Mitchell et al. |
| 6,061,304 A | 5/2000 | Nagata et al. |
| 6,069,848 A | 5/2000 | McDonald et al. |
| 6,205,090 B1 | 3/2001 | Blount et al. |
| 6,215,862 B1 | 4/2001 | Lopes |
| 6,236,623 B1 | 5/2001 | Read et al. |
| 6,269,055 B1 | 7/2001 | Pikula et al. |
| 6,288,979 B1 | 9/2001 | Kwok |
| 6,304,518 B1 | 10/2001 | O'Neill |
| 6,324,495 B1 | 11/2001 | Steinman |
| 6,339,397 B1 | 1/2002 | Baker |
| 6,343,050 B1 | 1/2002 | Kwok |
| 6,493,338 B1 | 12/2002 | Preston et al. |
| 6,542,120 B1 | 4/2003 | Gilbertson |
| 6,693,851 B1 | 2/2004 | Fujisawa et al. |
| 6,728,533 B2 | 4/2004 | Ishii |
| 6,816,439 B1 | 11/2004 | Kawahara et al. |
| 6,873,573 B2 | 3/2005 | Pikula et al. |
| 2002/0018402 A1 | 2/2002 | Egle et al. |
| 2002/0098857 A1 | 7/2002 | Ishii |
| 2002/0186619 A1 | 12/2002 | Reeves et al. |

OTHER PUBLICATIONS

Lat-Lon Webpage, Hardware, http://web.archive.org/web/20050208204400/http://www.lat-lon.com/hardware.html, Feb. 8, 2005.

Lat-Lon Webpage, Wireless Communication, http://web.archive.org/web/20041012005924/http://www.lat-lon.com/wirelessCommunication.html, Oct. 12, 2004.

Lat-Lon Webpage, Fleet Management, GPS, http://web.archive.org/web/20041012053552/http://www.lat-lon.com/fleetManagement.html, Oct. 12, 2004.

Lat-Lon Webpage, GPS, http://web.archive.org/web/20041012054230/http://www.lat-lon.com/gps.html, Oct. 12, 2004.

Lat-Lon Webpage, Applications, http://web.archive.org/web/20040815212020/http://www.lat-lon.com/applications.html, Aug. 15, 2004.

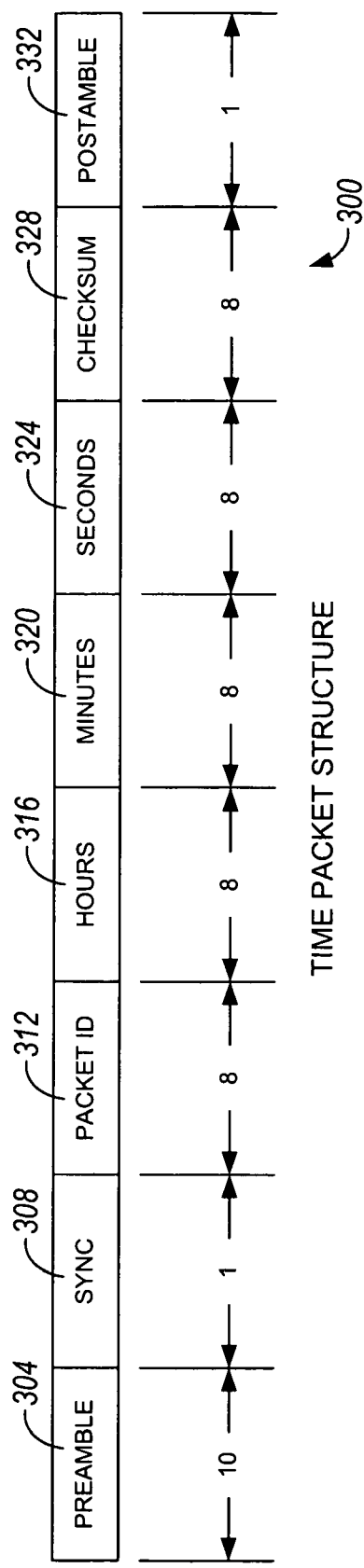
FIG. 3A  TIME PACKET STRUCTURE
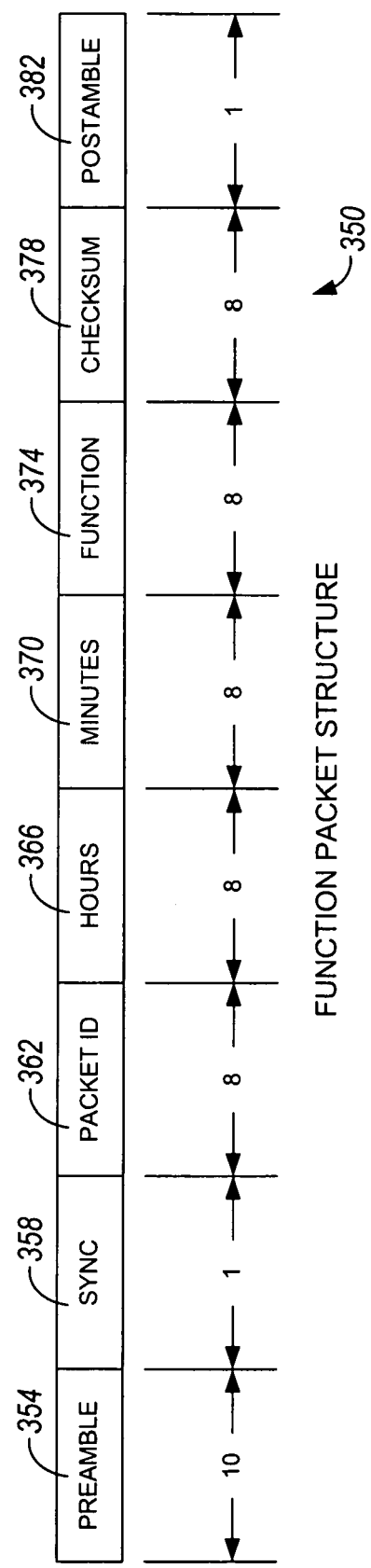
FIG. 3B  FUNCTION PACKET STRUCTURE

US 7,369,462 B2

WIRELESS SYNCHRONOUS TIME SYSTEM WITH SOLAR POWERED TRANSCEIVER

RELATED APPLICATIONS

The present patent application claims priority to U.S. Provisional Patent Application Ser. No. 60/613,865 titled "SOLAR POWERED GPS TRANSCEIVER WITH SENSORS," filed on Sep. 28, 2004, and is a continuation-in-part of co-pending U.S. patent application Ser. No. 11/086,860, filed on Mar. 22, 2005 now abandoned, which is a continuation of U.S. patent application Ser. No. 10/094,100, filed on Mar. 8, 2002, now abandoned, the entire contents of which are all hereby incorporated by reference. The present patent application is also a continuation-in-part of co-pending U.S. patent application Ser. No. 10/979,049, filed on Nov. 2, 2004, which is a continuation-in-part of U.S. patent application Ser. No. 10/876,767, filed on Jun. 25, 2004, which is a continuation of U.S. patent application Ser. No. 09/960,638, filed on Sep. 21, 2001, now U.S. Pat. No. 6,873,573, the entire contents of which are all hereby also incorporated by reference.

BACKGROUND

The present invention relates to synchronous time systems and particularly to systems having "slave" devices synchronized by signals transmitted by a controlling "master" device. More particularly, the present invention relates to synchronous time systems, wherein the master device wirelessly transmits the signals to the slave devices.

Conventional hard-wired synchronous time systems (e.g., clock systems, bell systems, etc.) are typically used in schools and industrial facilities. The devices in these systems are wired together to create a synchronized system. Because of the extensive wiring required in such systems, installation and maintenance costs may be high.

SUMMARY

Conventional wireless synchronous time systems are not hard-wired, but instead rely on wireless communication among devices to synchronize the system. For example, one such system utilizes a government WWVB radio time signal to synchronize a system of clocks. This type of radio controlled clock system typically includes a master unit that broadcasts a government WWVB radio time signal and a plurality of slave clocks that receive the time signal. To properly synchronize, the slave clock units must be positioned in locations where they can adequately receive the broadcast WWVB signal. Interference generated by power supplies, computer monitors, and other electronic equipment may interfere with the reception of the signal. There are also areas, such as the east coast of the United States, where the WWVB signal is weak or where the WWVB signal cannot reliably penetrate buildings. Additionally, the antenna of a radio controlled slave clock can be de-tuned if it is placed near certain metal objects, including conduit, wires, brackets, bolts, etc., which may be hidden in a building's walls. Wireless synchronous time systems that provide reliable synchronization and avoid high installation and maintenance costs would be welcomed by users of such systems.

Furthermore, orbiting satellites, such as global positioning system ("GPS") satellites, provide a precision time signal that can be received throughout the world, and many schools, hospitals, businesses, and other organizations have synchronized time systems that use the accurate time from GPS satellites for their precision time source. GPS satellite signals are transmitted on low power high frequency radio signals. The penetration of these radio signals through the atmosphere is good; however, these high frequency signals do not penetrate solids, such as building materials, very well. As a result, indoor reception of these satellite signals ranges from poor to non-existent. To achieve good, consistent signal reception from these satellites, the receiver should be located outside in an open area with a clear view of the sky.

Although locating a GPS receiver in an open area solves the reception problem, it can create additional problems. A first problem can include getting power to the GPS receiver so that it can operate, and a second problem can include getting the time or other data from the outdoor GPS receiver to another location, such as an indoor location, where it is to be used. There are wired solutions to these problems, but they can be costly to install and maintain (e.g., difficulty and cost of drilling holes, running a cable, providing a good seal around the cable in order to withstand outdoor environments, etc.) and may be inconvenient, cosmetically undesirable, or impractical for some applications.

Furthermore, typical wired GPS receivers are also usually located on the tops of roofs and on metal poles that are exposed to potential lightning strikes. In the event of a GPS receiver being struck by lightning, cables connected to the GPS receivers provide a direct electrical link to secondary receivers and/or power sources connected to the GPS receivers, thus extending the damage from lightning to the connected devices.

Embodiments of the invention provide a wireless synchronous time system comprising a primary event device or "master" device including a first receiver operable to receive a global positioning system ("GPS") time signal, and a first processor coupled to the first receiver to process the GPS time signal. The primary event device also includes a memory coupled to the first processor and operable to store a programmed instruction, including a preprogrammed time element and a preprogrammed function element. The primary event device also includes an internal clock coupled to the first processor to store the time component and to increment relative to the stored time component thereafter to produce a first internal time. A transmitter is also included in the primary event device and is coupled to the first processor to transmit the first internal time and the programmed instruction.

The synchronized event system further includes a secondary event device or "slave" device having a second receiver to wirelessly receive the first internal time and the programmed instruction, which are transmitted by the primary event device. The secondary event device includes a second processor coupled to the second receiver to selectively register the programmed instruction, a second internal clock coupled to the processor to store the time component and to increment relative to the stored time component thereafter to produce a second internal time, and an event switch operable to execute the registered programmed instruction when the second internal time matches the preprogrammed time element of the programmed instruction.

In some embodiments, the secondary event device or "slave" device may include an analog clock, a digital clock, one or more time-controlled switching devices (e.g., a bell, a light, an electronic message board, a speaker, etc.), or any other device for which the functionality of the device is synchronized with other devices. In these devices, the programmed instruction includes an instruction to display time and/or an instruction to execute a function at a predetermined time. The programmed instruction is broadcast to the "slave" unit devices by the primary event device or "master" device. In this way, for example, the master device synchronizes the time displayed by a system of analog slave clocks, synchronously sounds a system of slave bells, synchronizes the time displayed by a system of slave digital clocks, or synchronizes any other system of devices for which the functionality of the devices of the system is desired to be synchronized. In some embodiments, the master device transmits multiple programmed commands (a "program") to the slave devices and the slave devices include a processor operable to execute the multiple programmed commands.

In some embodiments, these systems further include a power interrupt module coupled to the processors to retain the internal time and the programmed instruction in the event of a power failure. Both the "master" primary event device and the "slave" secondary event device are able to detect a power failure and store current time information into separate memory modules.

The system is synchronized by first receiving a GPS time signal at the master device and setting a first internal clock to the GPS time signal. The first internal clock is then incremented relative to the GPS time signal to produce a first internal time. Operational data in the form of the programmed instruction, including the preprogrammed time element and the preprogrammed function element, is then retrieved from a memory and is wirelessly transmitted along with the first internal time. A second receiver at the "slave" device wirelessly receives the first internal time and the operational data and selectively registers it. A second internal clock within the "slave" device is set to the first internal time and is incremented relative thereto to produce a second internal time. In preferred embodiments, such as an analog clock, the second internal time is simply displayed. In other slave devices, such as a system of bells, a function is identified from the preprogrammed function element and is executed (e.g., bells or alarms are rung) when the second internal time matches the preprogrammed time element.

Embodiments further provide a synchronous event system comprising a primary device and a secondary device. In one construction, the primary device includes a solar panel operable to convert light into electricity, a first receiver operable to receive a global positioning system time signal, a first processor coupled to the first receiver and operable to process the global positioning system time signal to produce a processed time component, a first internal clock coupled to the first processor and operable to store the processed time component and to increment relative to the processed time component thereafter to produce a first internal time, and a transmitter coupled to the first processor and operable to transmit the first internal time. The secondary device can include a second receiver operable to wirelessly receive the first internal time, a second processor coupled to the second receiver, and a second internal clock coupled to the second receiver and operable to store the first internal time and to increment relative to the first internal time thereafter to produce a second internal time.

Additional embodiments provide a primary device for a synchronous event system involving the primary device and at least one secondary device whose operation is at least in part dependent on information transmitted by the primary device. In one construction, the primary device includes a solar panel operable to convert light into electricity, a receiver operable to receive a global positioning system time signal, a processor coupled to the receiver and operable to process the global positioning system time signal to produce a processed time component, an internal clock coupled to the processor and operable to store the processed time component and to increment relative to the processed time component thereafter to produce an internal time, and a transmitter coupled to the processor and operable to transmit the internal time to a secondary device for at least wireless reception by the secondary device and synchronization of the secondary device relative to the primary device.

Another embodiment provides a primary device for a synchronous event system involving the primary device and at least one secondary device whose operation is at least in part dependent on information transmitted by the primary device. In one construction, the primary device includes at least one sensor operable to detect at least one environmental condition and to produce a condition signal based on the at least one environmental condition, a receiver operable to receive a global positioning system time signal, a processor coupled to the receiver and operable to process the global positioning system time signal to produce a processed time component, an internal clock coupled to the processor and operable to store the processed time component and to increment relative to the processed time component thereafter to produce an internal time, and a transmitter coupled to the processor and operable to transmit the internal time and the condition signal to a secondary device for at least wireless reception by the secondary device and synchronization of the secondary device relative to the primary device.

Some embodiments also provide a secondary device for a synchronous event system involving the secondary device and a primary device, wherein operation of the secondary device is at least in part dependent on synchronization and programming information transmitted by the primary device. In one construction, the secondary device includes a receiver operable to wirelessly receive a first internal time and a condition signal transmitted by the primary event device, the first internal time being derived from a global positioning system time signal, a processor coupled to the receiver and operable to process the condition signal to produce weather information, an output operable to provide at least a portion of the weather information, and a second internal clock coupled to the receiver and operable to store the first internal time and to increment relative to the first internal time thereafter to produce a second internal time.

Still further embodiments provide a method of assembling a synchronous event system for operation, the system comprising a primary device having a solar panel for converting light to electricity and a first internal clock, and a secondary device having a second internal clock. In one construction, the method includes positioning the primary device in a first location wherein a first signal including a time component is accessible and light to be converted by the solar panel is accessible, determining a transmitting region surrounding the first location and in which signals transmitted by the primary device can be received, and positioning the secondary device in a second location within the transmitting region.

BRIEF DESCRIPTION OF THE DRAWINGS

FIG. 3A shows a time package structure used in the transmission of the time element of FIG. 1.

FIG. 3B shows a function package structure used in the transmission of the programmed instruction element of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other constructions and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting and coupling. Further, "connected" and "coupled" are not restricted to physical or mechanical connections or couplings and can include electrical connections and couplings, whether direct or indirect.

Figure 1:
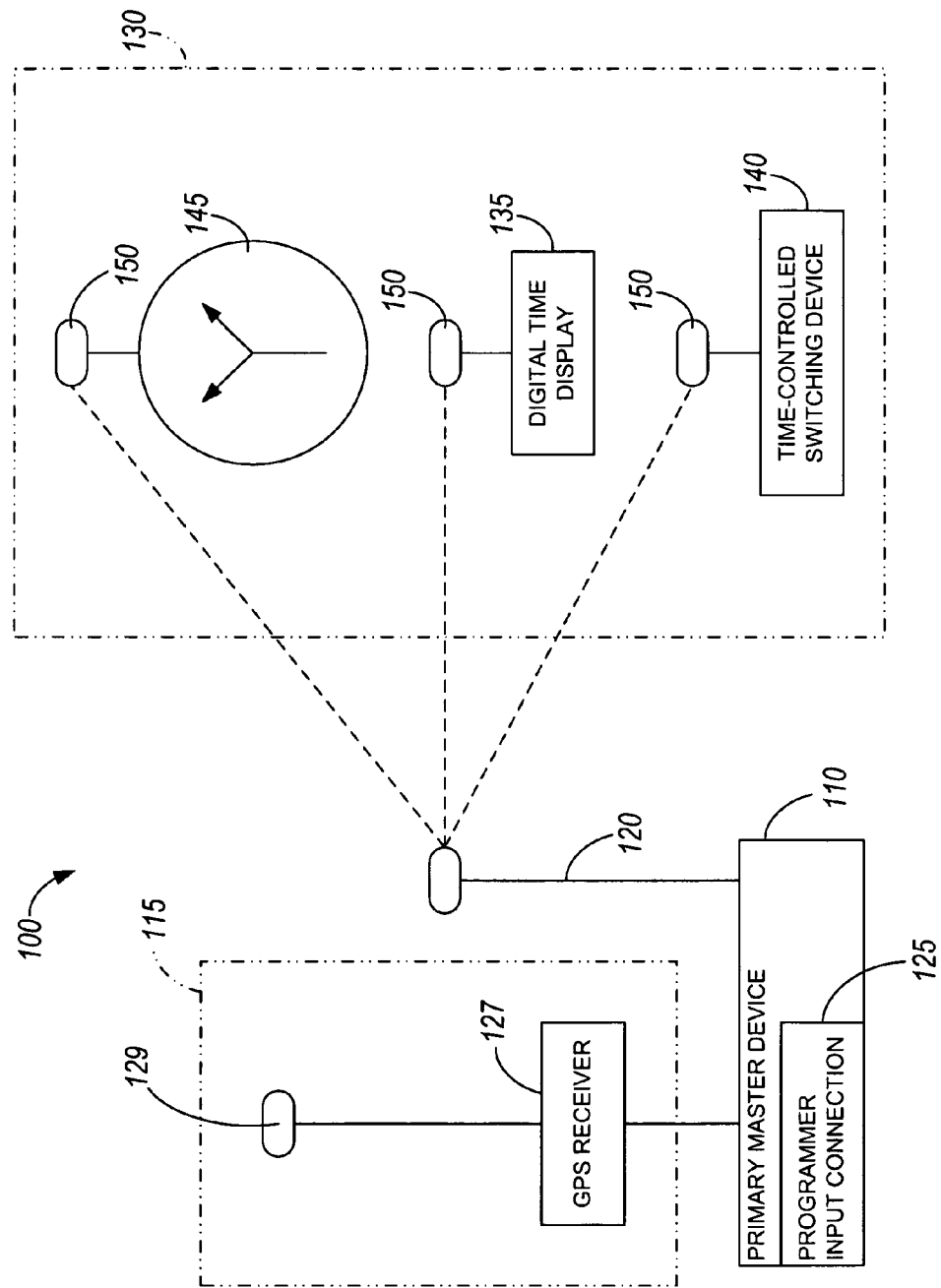
FIG. 1 shows a block diagram of a wireless synchronous time system according to embodiments of the invention including a master device that receives a GPS signal and broadcasts a time and programmed instruction to a system of slave devices.

Referring to FIG. 1, a wireless synchronous time system 100 in accordance with the present invention includes a primary "master" device 110, which receives a first time signal through a receiving unit 115 and broadcasts a second time signal to a plurality of "slave" secondary event devices 130. The receiving unit 115 can include a global positioning system ("GPS") receiver 127 having an antenna 129 which receives a GPS signal, including a GPS time signal component. The receiving unit 115 can send the GPS time signal component to the primary master device 110 where it is processed as further discussed below. In other embodiments, the primary device 110 can receive a first time signal from another system that may or may not include a GPS time signal component.

The primary master device 110 can further include a transmission unit 120, which wirelessly transmits a signal to the secondary or "slave" devices 130. In one embodiment, the signal sent to the slave devices 130 includes the processed GPS time signal component and/or a programmed instruction that is input to the primary master device 110 through a programmer input connection 125. The programmed instruction includes a preprogrammed time element and a preprogrammed function element, which, along with the GPS time signal component, is transmitted by the primary master device 110 to synchronize the slave devices 130. In one construction, the processed GPS time signal component and the programmed instruction are wirelessly transmitted to the slave devices 130 at approximately a frequency between 72 and 76 MHz. In another construction, the processed GPS time signal component and the programmed instruction are wirelessly transmitted to the secondary devices 130 at a frequency of approximately 154 MHz.

FIG. 1 illustrates a few examples of secondary or slave devices 130. As shown in FIG. 1, examples of secondary or slave devices 130 can include an analog time display 145, a digital time display 135, and one or more switching devices 140, which may be associated with any one of a number of devices, such as a bell, a light, a lock, a speaker, etc. In other constructions, such as the construction illustrated in FIG. 4b, the secondary devices 130 can also include such devices as a message board 147.

Each of the secondary devices 130 includes an antenna 150 to wirelessly receive the signal from the primary device 110, such as, for example, the processed GPS time signal component and the programmed instruction. Each of the secondary devices 130 also includes a processor (see FIG. 4, element 410 and FIG. 5, element 525, not shown in FIG. 1) to process the processed time signal and the programmed instruction received from the primary device 110. As will be further discussed below, in some constructions, when the preprogrammed time element of the programmed instruction matches a second time generated by the slave device, an event will be executed.

The primary device 110 may also transmit one or more programmed instructions (a "program") that may be executed by the processor of the secondary devices 130. The program may include a message to be displayed by a message board, a tone or a wave file (a "sound file") to be generated by a speaker, an image file to be displayed by a monitor, or a function or algorithm to be performed on a data set. The secondary devices 130 may also store one or more programs in an internal memory and receive a direction of which program to retrieve from the internal memory and execute from the primary device 110. The primary device 110 may also transmit input parameters to a secondary device 130 that the processor of the secondary device 130 may use when executing a program.

For the analog time display 145, as shown in FIG. 1, an executed event can include positioning an hour, minute, and second hand to visually display the current time. For the digital time display 145, an executed event can include digitally displaying the current time. For a time controlled switching device 140, an executed event may include any of a number of events that may be controlled by a switch. For example, a system of bells may include switches that sound the bells at a particular time. Alternatively, a system of lights may include switches that turn the lights on or off at a particular time. For the message board 147 (see FIG. 4*b*), in one construction, an executed event may include displaying a message stored in a memory of the secondary device 130 at a certain time. In another construction, for the message board 147, an executed event may include displaying a message that accompanies a time component transmitted by the primary device 110.

It will be readily apparent to those of ordinary skill in the art that the secondary devices 130 may include any one of a number of electronic devices for which a particular functionality is desired to be performed at a particular time, such as televisions, radios, electric door locks, lights, etc.

Figure 2:
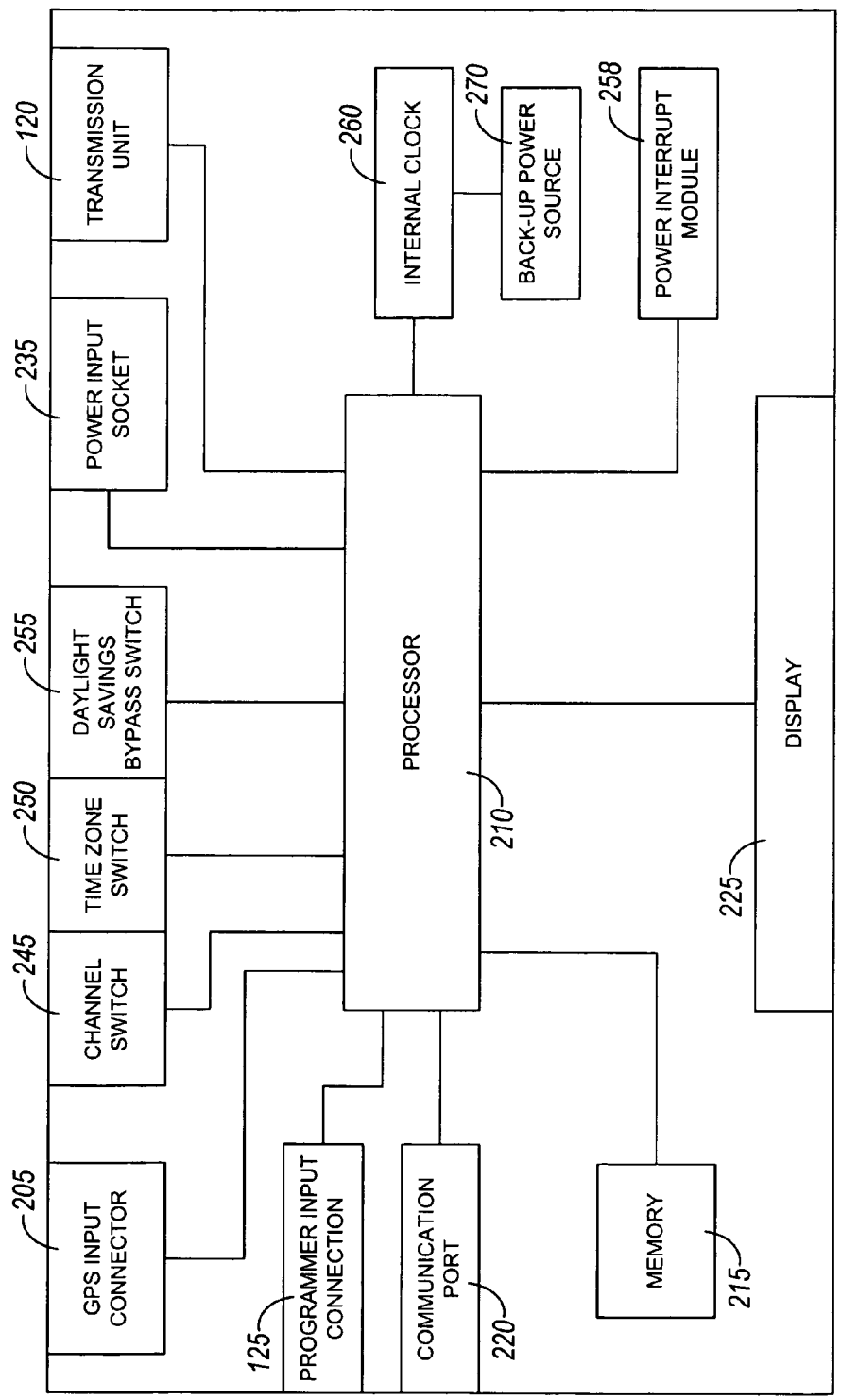
FIG. 2 shows a block diagram of the master device of FIG. 1.

Referring to FIG. 2, a detailed diagram of the primary master device 110 is shown. The primary master device 110 can receive a time signal component, such as the GPS time signal component from the receiving unit 115 (FIG. 1) at an input unit, such as the GPS time signal input receiving unit or connector 205. The primary master device 110 can further include a processor 210, a memory 215, a programmer input connector 125, a communication port 220, a display 225, a transmission unit 120, and a powered input socket 235. In some embodiments, these elements of the primary master device 110 serve to receive, process, and transmit information used to synchronize the slave units 130, as will be fully discussed below. The communication port 220 may be used to perform diagnostic testing or auditing or to perform software upgrades or modifications by an external computing device (i.e., a personal computer, a PDA, etc.). Additionally, the primary device 110 can include a channel switch 245, time zone switch 250, and a daylight savings bypass switch 255. In some embodiments, the primary device 110 includes a power interrupt module 258 coupled to the processor 210 to retain the internal time and the programmed instruction in the event of a power loss.

In some embodiments, upon powering up the primary device 110, the processor 210 of the primary device 110 checks the setting of the channel switch 245, the time zone switch 250, and the daylight savings bypass switch 255. The processor 210 stores the switch information in the memory 215. In some embodiments, a signal is received through the antenna 129 of the receiving unit 115 and a time signal component is extracted from it. For example, in some embodiments using a GPS time signal, a GPS signal is received through the antenna 129 of the receiving unit 115 and a GPS time signal component is extracted from it. When the receiving unit 115 or the connector 205 receives the GPS time signal component, the processor 210 adjusts the GPS time signal component according to the switch information of the channel switch 245, the time zone switch 250, and the daylight savings bypass switch 255 and sets an internal clock 260 of the primary device 110 to the processed GPS time signal component to produce a first internal time.

The channel switch 245 enables a user to select a particular transmission frequency or range of frequencies determined best for transmission in the usage area, and to independently operate additional primary master devices in overlapping broadcast areas without causing interference between them. The GPS time signal uses a coordinated universal time ("UTC") and requires a particular number of compensation hours to display the correct time and date for the desired time zone.

The time zone switch 250 enables the user to select a desired time zone, which permits worldwide usage. The time zone switch 250 or a separate switch may also be used to compensate for fraction-of-an-hour time differences. For example, in some areas a half-an-hour time offset may be added to the received time component to generate a correct time.

The time input to the GPS connector 205 may or may not include daylight savings time information. As a result, users in areas, or for applications, that do not require daylight savings adjustment may be required to set the daylight savings bypass switch 255 to bypass an automatic daylight savings adjustment program. Manual daylight savings time adjustment can also be accomplished by adjusting the time zone switch 250 to a desired time zone to retain a correct time.

Once the processor 210 adjusts the GPS time signal component according to the settings of the switches discussed above and sets the internal clock 260 to produce the first internal time, the internal clock 260 starts to increment the first internal time until another GPS time signal is received from the GPS receiver 127 of the receiving unit 115 (FIG. 1). Between receiving GPS time signals, the internal clock 260 independently keeps the first internal time which, in addition to other information, such as date information and reception status, can be displayed on the display 225 of the primary device 210. The internal clock 260 may also include a back-up power source 270 for retaining power to the internal clock 260 if a primary power source (i.e., power supplied by an alternating current outlet) is lost, disrupted, or insufficient for supplying needed power to the primary device 110. In some embodiments, the back-up power source 270 includes a battery.

In addition to processing the time signal, the processor 210 also checks for a new programmed instruction on a continuous basis, and stores any new programmed instructions in the memory 215. As briefly mentioned above, to enter a programmed instruction, a user keys in the programmed instruction into a computing device (e.g., a personal computer, a PDA, etc.) and transfers the programmed instruction to the primary master device 110 through the programmer input connector 125. The programmed instruction is stored in the memory 215 and, along with the first internal time kept in the internal clock 260, is transmitted through the transmission unit 120 at the transmission frequency set in the channel switch 245.

The first internal time and the programmed instruction are transmitted by the primary device 110 using a data protocol as shown in FIGS. 3A and 3B. FIG. 3A shows a time packet structure 300 comprising a preprogrammed time element having a 10-bit preamble 304, a sync bit 308, a packet identity byte 312, an hour byte 316, a minute byte 320, a second byte 324, a checksum byte 328, and a postamble bit 332. FIG. 3B shows a function packet structure 350 comprising a preprogrammed function element having a 10-bit preamble 354, a sync bit 358, a packet identity byte 362, an hour byte 366, a minute byte 370, a function byte 374, a checksum byte 378, and a postamble bit 382.

Each secondary device 130 receives the signals broadcast by the primary device 110. The signals can include information structured according to the time packet structure of FIG. 3A and the function packet structure FIG. 3B. Each secondary device 130 attempts to match the packet identity bytes 312 or 362 with the setting of a user configurable identification ("ID") switch (e.g., ID switch 384 of FIGS. 5*a* and 5*b*) or with an internal identity number programmed in the processor of the secondary device 130 (i.e., 410 of FIG. 4 or 525 of FIG. 5) to selectively register the program instruction. It should be readily apparent to those of ordinary skill in the art that the time packet structure 300 and the function packet structure 350 may have a different structure size so that more or less information may be transmitted using these packets. For example, the time packet structure may include, in addition to the existing timing bytes, a month byte, a day byte, a year byte, and a day of the week byte. Similarly, the function packet structure 350 may include additional hour, minute, and function bytes to terminate the execution of an event triggered by the hour, minute, and function bytes 366, 370, and 374, shown in FIG. 3B.

Figure 4:
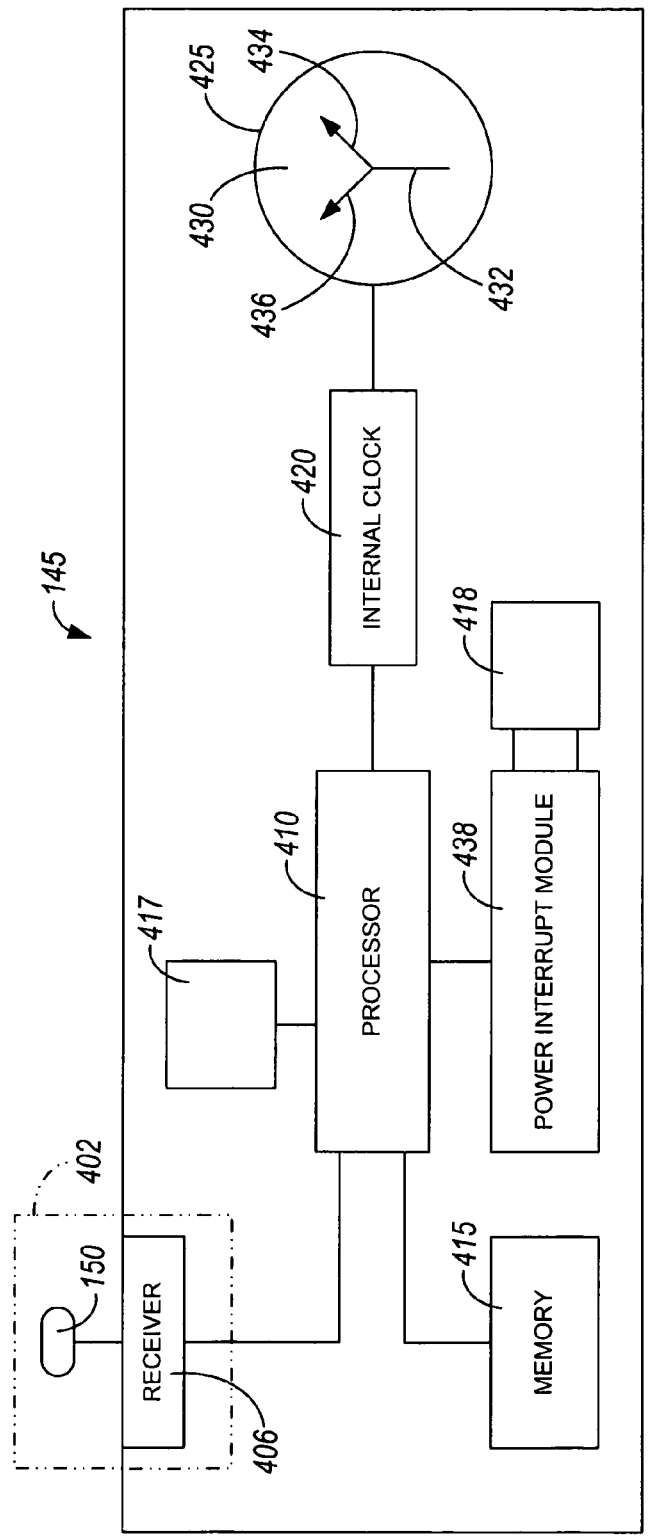
FIG. 4 shows a block diagram of an analog clock slave device of FIG. 1.

A diagram of the analog time display 145 of FIG. 1 is shown in FIG. 4. The analog time display 145 includes a second receiving unit 402 having an antenna 150 and a second receiver 406. The analog time display also includes a second processor 410, a second memory 415, a second internal clock 420, and an analog display 425. The analog display 425 includes a set of hands 430 including a second hand 432, a minute hand 434, and an hour hand 436. As with the primary device 110, the analog time display 145 also includes a power interrupt module 438 coupled to the processor 410 to retain an internal time and a programmed instruction in the event of a power interruption to the analog time display 145.

In some constructions, the secondary devices 130 can also include an indicator 417 that indicates whether the secondary device 130 is receiving any signals from the primary device 110. In one construction, the indicator 417 can include a light emitting diode ("LED") that flashes in response to an incoming signal received and processed by the secondary device 130. In another construction, the indicator 417 can include an LED that flashes after a certain period of time elapses during which the secondary device 130 does not receive any signal from the primary device 110. In other constructions, the indicator 417 can include a speaker operable to indicate the reception or lack of reception of a signal with an audible indication.

In some constructions, the indicator 417 can also be used to indicate the execution of an instruction. For example, an LED may flash or a speaker may transmit a sound or recording that indicates that an event will occur, is occurring, or has occurred, such as the locking of a door or the turning off of a light.

In some constructions, the secondary devices 130 also include a power source 418. In the illustrated construction of FIG. 4, the power source 418 includes a battery, such as a D-size battery, for example. The second devices 130 may also include a solar panel or other generally portable power source. In these constructions, the secondary devices 130 do not need to be placed within an area with a power source readily available, such as, for example, within a certain area of an alternating current ("AC") outlet that can have a generally fixed position that limits the placement of the secondary device 130. In some constructions, the primary device 110 may include a generally portable power source, such as a battery or a solar panel.

Figure 4A:
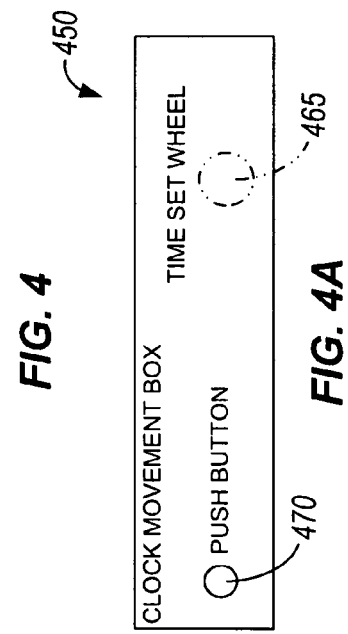
FIG. 4a shows a clock movement box used in the setting of the slave clock of FIG. 4.

FIG. 4a illustrates a clock movement box 450 having a manual time set wheel 465 and a push button 470 for setting the position of the hands 430 of the analog display 425. The clock movement box 450 is of the type typically found on the back of conventional analog display wall clocks, and is used to set such clocks. In setting the analog slave clock 145, the manual time set wheel 465 of the clock movement box 450 is initially turned until the set of hands 430 shows a time within 29 minutes of the GPS time (i.e., the actual time). When power is applied to the slave analog clock 145, the second hand 432 starts to step. The push button 470 of the clock movement box 450 is depressed when the second hand reaches the 12 o'clock position. This signals to the second processor 410 that the second hand 432 is at the 12 o'clock position, enabling the second processor 410 to "know" the location of the second hand 432. The push button 470 is again depressed when the second hand 432 crosses over the minute hand 434, wherever it may be. This enables the second processor 410 to "know" the location of the minute hand 434 on the clock dial. (See U.S. patent application Ser. No. 09/645,974 to O'Neill, the disclosure of which is incorporated by reference herein). The second processor 410 may also "know" the location of the hands of the clock dial by optically detecting the hands 430 of the analog time display 145 or the position of gears within the analog time display 145 that determine the position of the hands.

To synchronize itself to the primary device 110, the second receiver 406 of the analog time display 145 automatically and continuously or periodically searches a transmission frequency or a channel that contains the first internal time and the programmed instruction. When the receiving unit 402 wirelessly receives and identifies the first internal time, the processor 410 stores the received first internal time in the second internal clock 420. The second internal clock 420 immediately starts to increment to produce a second internal time. The second internal time is kept by the second internal clock 420 until another first internal time signal is received by the analog time display 145. If the processor 410 determines that the set of hands 430 displays a lag time (i.e., since a first internal time signal was last received by the analog time display 145, the second internal clock 420 has fallen behind), the processor 410 speeds up the second hand 432 from one step per second to a rate greater than one step per second until both the second hand 432 and the minute hand 434 agree with the newly established second internal time. If the processor 410 determines that the set of hands 430 shows a lead time (i.e., since the first internal time signal was last received by the analog time display 145, the second internal clock 420 has moved faster than the time signal relayed by the master device), the processor 410 slows down the second hand 432 from one step per second to a rate less than one step per second until both the second hand 432 and the minute hand 434 agree with the newly established second internal time.

Figure 4B:
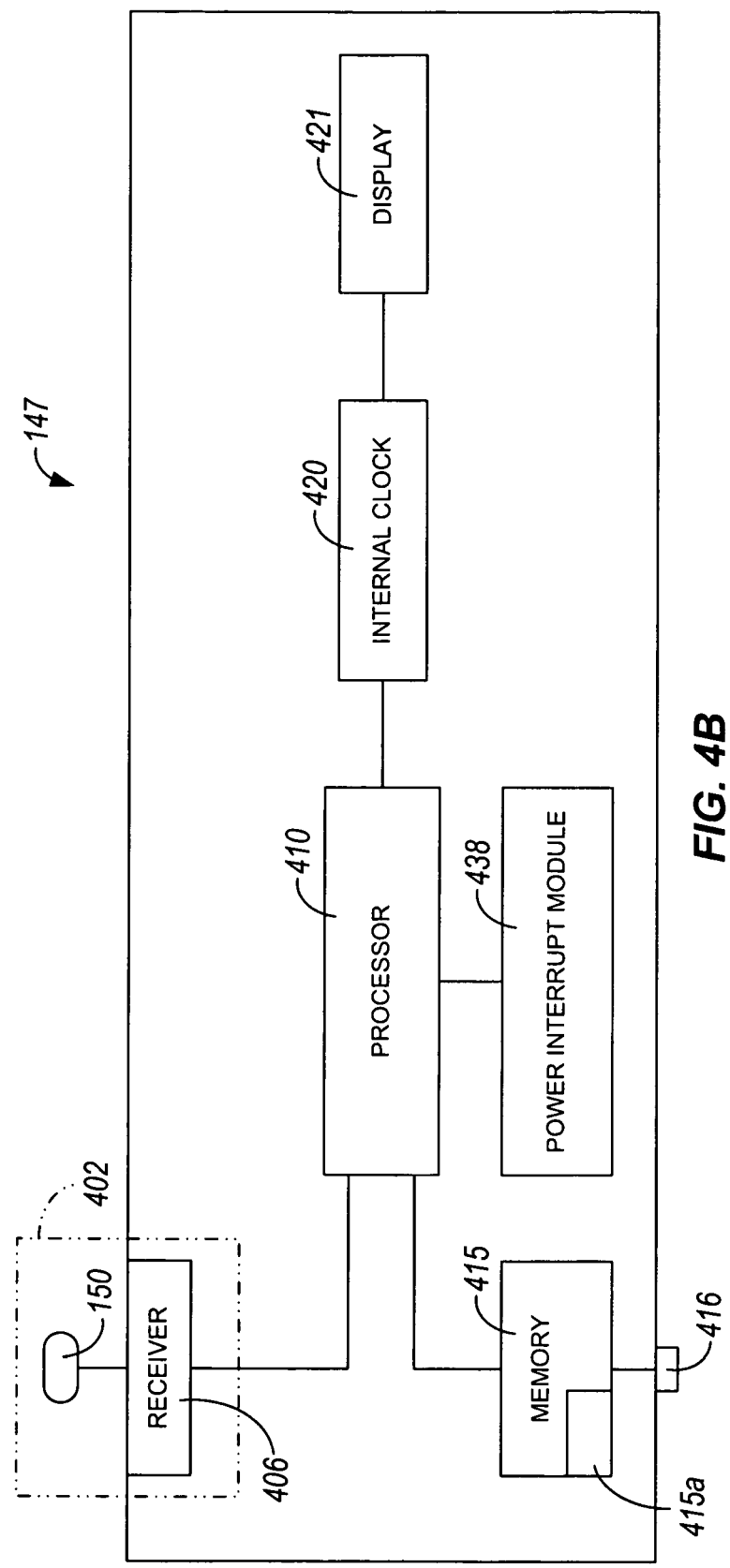
FIG. 4b shows a block diagram of a secondary device of FIG. 1.

FIG. 4b illustrates a message board 147, which is another example of a secondary device 130 for use in the synchronous system 100. In some constructions, the message board 147 includes similar components to the analog time display 145, such as, for example, a receiving unit 402, a processor 410, memory 415, a power interrupt module 438, and an internal clock 420. The message board 147 further includes a display 421. In some constructions, the message board 147 can store preprogrammed messages in a portion 415a of memory 415. The messages can be hardwired into the memory portion 415a or can be manually entered via a programmer input connector 416. In other constructions, the messages are stored in the primary device 110 and are wirelessly transmitted to the board 147. In these constructions, the processor 410 of the message board 147 can parse the signal received from the primary device 110, extract the message and the time at which the message is to be displayed from the signal, and store the extracted information in the memory 415. In further constructions, the message board 147 can also include an analog clock movement unit (not shown) to display the time. The time can also be shown on the display 421.

Figure 5A:
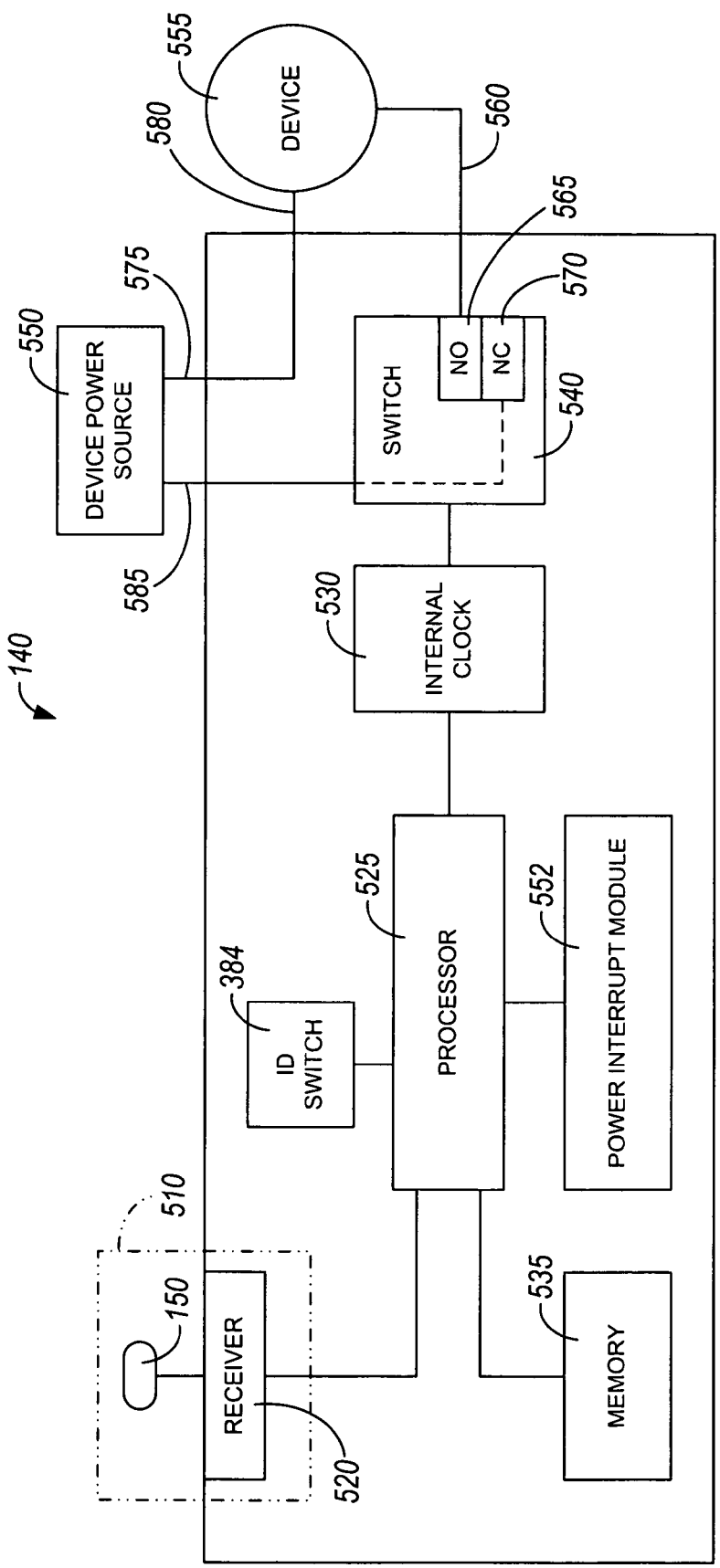
FIG. 5a shows a block diagram of a slave device of FIG. 1, which includes a switch for controlling the functionality of the device.
Figure 5B:
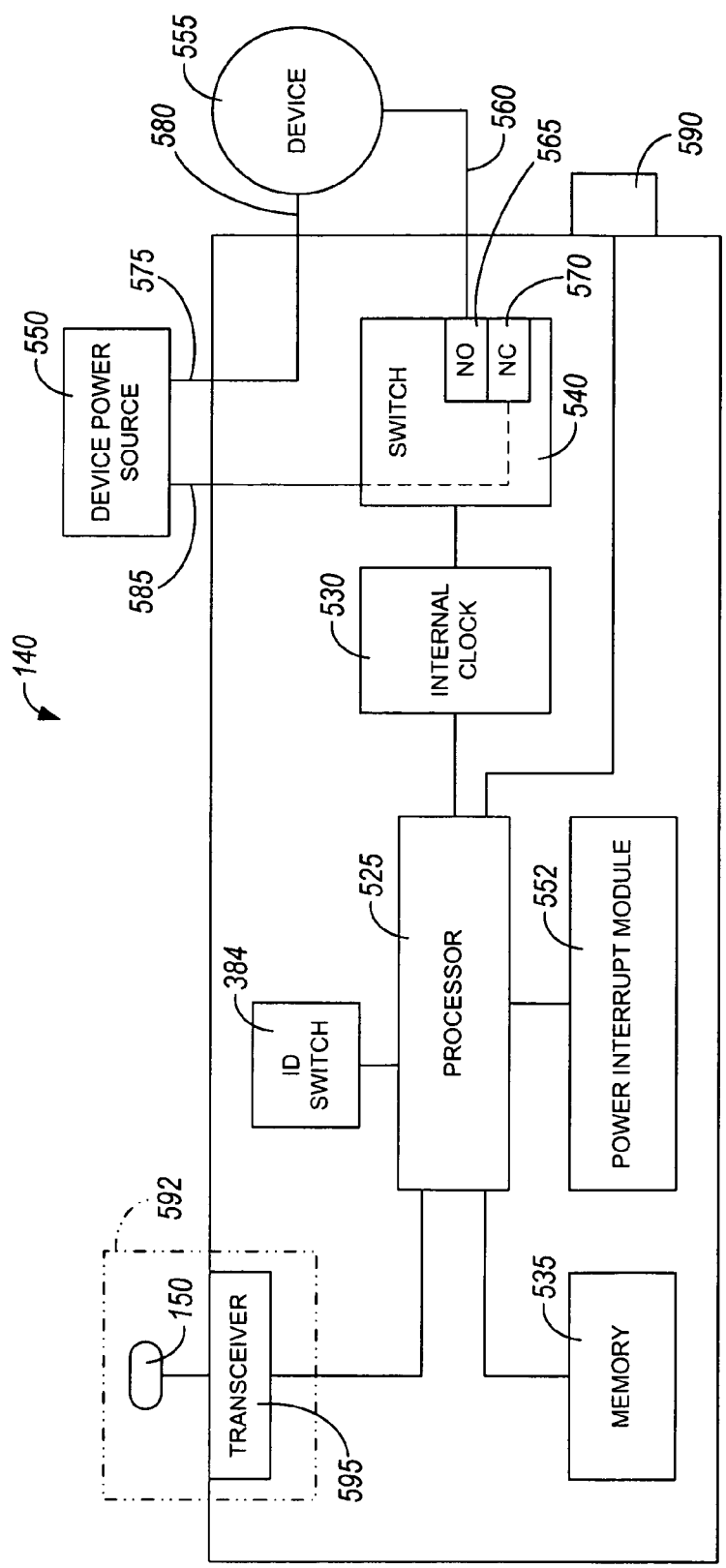
FIG. 5b shows a block diagram of another slave device of FIG. 1, which includes a switch for controlling the functionality of the device.

In addition to time displays 145 and 135 that display the synchronized time signal, a secondary device 130 may include one or more switching devices 140 as depicted in FIGS. 5a and 5b. Instead of or in addition to displaying a time signal, a switching device 140 utilizes a time signal to execute an event at a particular time, such as displaying a message on a message board, for example. In this way, a system of switching devices 140 can be synchronized.

Each slave switching device 140 includes a second receiving unit 510 having an antenna 150 and a second receiver 520, a second processor 525, a second internal clock 530, a second memory 535, an operating switch 540, and a device power source 550. The switching device 140 further includes a power interrupt module 552 coupled to the processor 410 to retain the internal time and/or the programmed instruction on a continuous basis, similar to the power interrupt module 258 of the primary device 110 and the power interrupt module 438 of the analog time display 145. A switching device 140 includes one or more devices 555, which are to be synchronously controlled. Depending upon the device 555 to be controlled, a first end 560 of the device 555 is coupled to a normally open end ("NO") 565 or a normally closed end ("NC") 570 of the operating switch 540 of the switching device 140. The first power lead 575 of the device power source 550 is also coupled to a second end 580 of the device 555, and a second power lead 585 of the device power source 550 is configured to be coupled to the normally open end 565 or the normally closed end 570 of the operating switch 540. The operating switch 540 may close and/or open a connection between the second power lead 585 and the normally open end 565 or normally closed end 570 of the operating switch 540 to break or complete a circuit that provides operating power or instructions to the device 555. It will be readily apparent to those of ordinary skill in the art that the device 555 and operating switch 540 may be constructed and operated in other constructions and/or manners than those illustrated and described. For example, the operating switch 540 may generate and transmit operating power and/or instructions to the device 555 over a wireless connection, such as over a radio frequency or infrared signal. The device 555 receives the operating power and/or instructions and begins and/or stops operating or modifies its operation as instructed.

As shown in FIG. 5b, a switching device 140 can also include one or more sensors 590. In some constructions, the sensor(s) 590 provides feedback regarding a performed event. For example, once an event is executed, such as the closing and locking of a door at a certain time, the sensor(s) 590 can verify whether the event was performed.

In other constructions, the sensor(s) 590 can provide an additional input factor for determining whether an event should take place. For example, the sensor 590 can include one or more motion detectors and an event can include turning off overhead lights at a certain time. If the motion detector(s), however, detects motion within a specified proximity, the processor 525 of the switching device 140 can determine not to execute the event (e.g., turn off the lights) at the scheduled time. Furthermore, feedback from the sensor(s) 590 can provide additional functionality, such as providing announcement of the execution of an event or enabling a warning once an event has been executed. For example, a buzzer or recording via a speaker can sound prior to an event, such as closing and locking a door. Also, the buzzer or recording can sound if someone attempts to open a door after a certain time.

Still referring to FIG. 5b, the secondary devices 130 can also record information detected by the one or more sensor(s) 590 in the memory 535. In some constructions, the devices 130 may include additional non-volatile memory. The secondary device 130 can also maintain a record of its operation in the memory 535.

In some constructions, the memory 535 of the secondary devices 130 can also store time adjustment information, such as daylight savings information, time zone information, etc. The time adjustment information can serve as a back-up in the event the secondary device 130 does not receive a signal from the primary device 110 or receives a signal from the primary device 110 that requires additional time adjusting than that performed by the primary device 110. For example, a group of secondary devices 130 may receive identical signals from a primary device 110, but one of the secondary devices 130 may process the received signal to display the time in one time zone (i.e., the time in New York) and another secondary device 130 may process the received signal to display the time in another time zone (i.e., the time in Paris).

In some constructions, the system 100 also allows for two-way communication between secondary devices 130 and primary device 110. In these constructions, the secondary device 130 can include a transceiving unit 592 (see FIG. 5b) in place of the second receiving unit 402 or can include both the second receiving unit 402 and a second transmitting unit (not shown). In these constructions, signals are transmitted at a frequency of approximately 154 MHz between the primary device 110 and the secondary device 130. The transceiving unit 592 may be operable to receive a second signal from the primary device 110 and transmit a third signal to the primary device 110.

In some constructions, like the receiver 406 of the analog time display 145, the second receiver 520 of the switching device 140 automatically searches a transmission frequency or a channel that contains a first internal time and a programmed instruction transmitted from the primary device 110. When the receiving unit 510 wirelessly receives and identifies the first internal time, the second processor 525 stores the received first internal time in a second internal clock 530. The second internal clock 530 immediately starts to increment to produce a second internal time until another first internal time signal is received from the primary device 110.

Additionally, in some constructions, the programmed instruction can be stored in the memory 535 of a secondary device 130, such as a switching device 140. When there is a match between the second internal time and the preprogrammed time element of the programmed instruction, the secondary device 130 executes the preprogrammed function element of the programmed instruction. For example, if the preprogrammed time element contains a time of day and the preprogrammed functional element contains an instruction to switch on a light, the light will be switched on when the second internal clock 530 reaches that time specified in the preprogrammed time element of the programmed instruction.

In other constructions, the switching device 140 does not store programmed instructions in the memory 535. Rather, the switching device 140 may receive instructions from the primary device 110.

Figure 6:
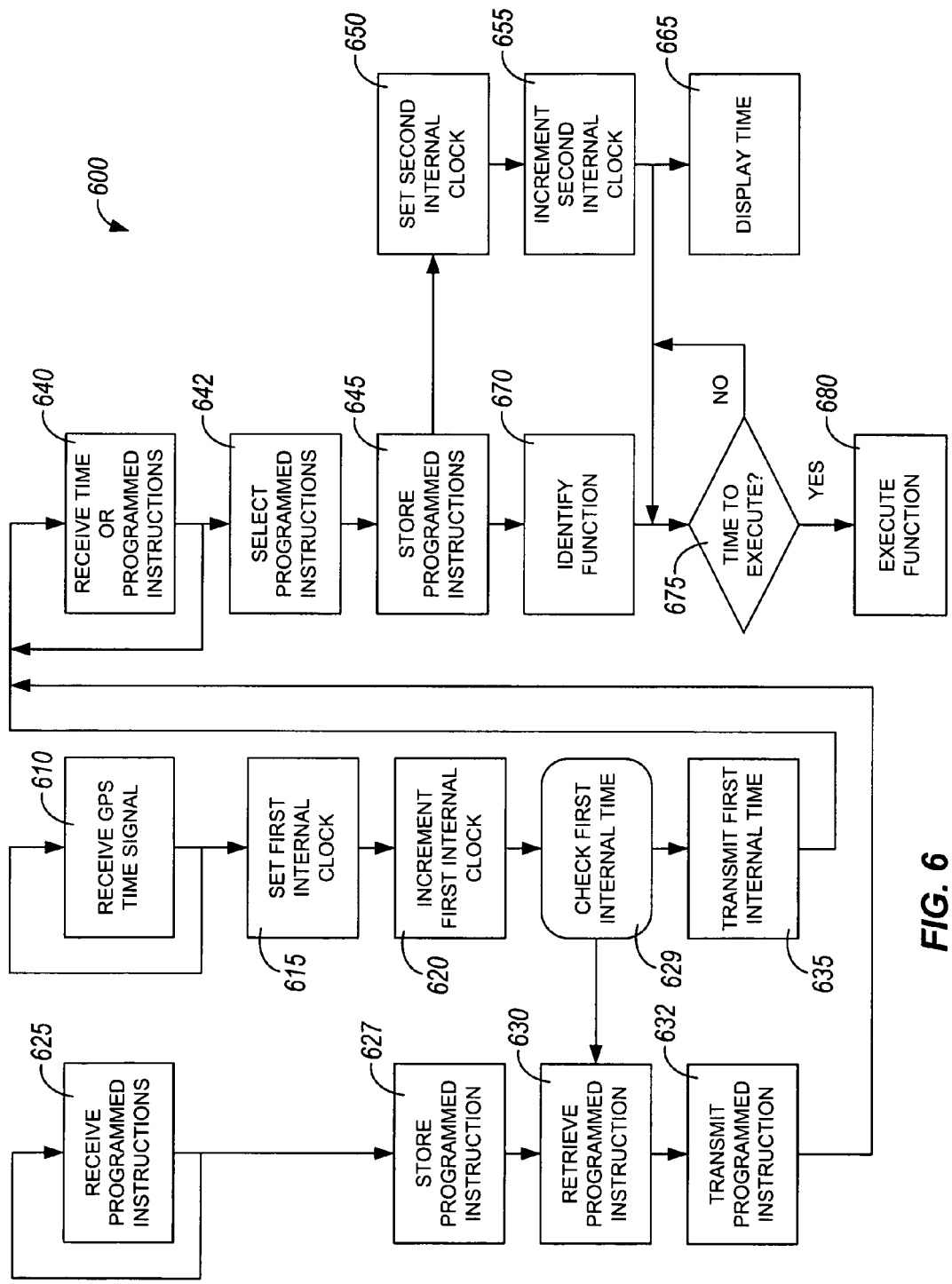
FIG. 6 shows a flow chart illustrating the functionality of a wireless synchronous time system in accordance with the present invention.

Referring to FIG. 6, a flow chart 600 illustrates a wireless synchronous time system according to embodiments of the invention. The flow chart 600 illustrates the steps performed by a wireless synchronous time system according to embodiments of the invention for any number of systems of secondary or slave devices. The process starts in a receiving step 610 where a primary or master device receives a GPS time signal. As indicated in the flow chart at step 610, the master device continuously looks for and receives new GPS time signals. Next, at step 615, a first internal clock is set to the received GPS time. Next, the first internal clock starts to increment a first internal time in step 620. In a parallel path, at step 625, the master device receives programmed instructions input by a user of the system. Again, the flow chart indicates that the master device is able to continuously receive programmed instructions so that a user may add additional programmed instructions to the system at any time. As discussed above, the programmed instructions include a preprogrammed time element and a preprogrammed function element. An entered programmed instruction is stored in a first memory of the master device at step 627. Next, when preset periodic times are reached at step 629, the master device retrieves the programmed instruction from the first memory at step 630 and transmits the programmed instruction to the slave device at step 632. The master device also transmits the first internal time to the slave device at step 635. In other words, when the first internal clock reaches particular preset times (e.g., every five minutes) the programmed instruction and the first internal time are wirelessly transmitted to the slave devices. The intermittent transmissions may conserve power consumption of the master device and the slave devices, since the frequency of wireless transmission can be regulated such that the devices operate with low power consumption.

The programmed instruction and/or the first internal time are received at the slave device in step 640. If the slave device is to merely synchronously display a time, such as a clock, but does not perform any functionality, there is no need to receive a programmed instruction. If the slave device, however, includes devices, such as bells, lights, locks, etc., that are to be synchronized, the processor of the slave device will also select, in addition to the first internal time, those programmed instructions where the packet identity byte matches an identity of the slave device from the programmed instruction transmitted by the master device at step 642. Matching programmed instruction(s) are then stored or registered in a memory of the slave device at step 645. The slave device also sets a second internal clock to the first internal time at step 650 to produce a second internal time. In step 655, like the first internal clock, the second internal clock will start to increment the second internal time. The second internal time is displayed at step 665. Meanwhile, a function is identified from the preprogrammed function element at step 670. When the second internal time has incremented to match the preprogrammed time element at step 675, the function identified from the preprogrammed function element is executed at step 680. Otherwise, the secondary slave device will continue to compare the second internal time with the preprogrammed time element until a match is identified.

It will be readily understood by those of ordinary skill in the art that both the first internal clock and the second internal clock increment and, thus, independently keep a relatively current time. Therefore, if, for some reason, the master device does not receive an updated GPS time signal, it will still be able to transmit the first internal time. Similarly, if, for some reason, the slave device does not receive a signal from the master device, the second internal clock will still maintain a relatively current time. In this way, the slave device will still display a relatively current time and/or execute a particular function at a relatively accurate time even if the wireless communication with the master device is interrupted. Additionally, the master device will broadcast a relatively current time and a relatively current programmed instruction even if the wireless communication with a satellite broadcasting the GPS signal is interrupted. Furthermore, the power interrupt modules of the master and slave devices help keep the system relatively synchronized in the event of power interruption to the slave and/or master devices.

In some constructions and in some aspects, the wireless synchronous time system 100 can include a primary device, one or more secondary devices, and one or more repeating devices. In some constructions, the primary device refers to the device that receives an initial reference time signal from a source, such as, for example, a source external to the system 100 (e.g., a GPS time signal from a GPS satellite). In these constructions, the repeating devices can be used to extend the coverage area of the system 100.

Figure 7:
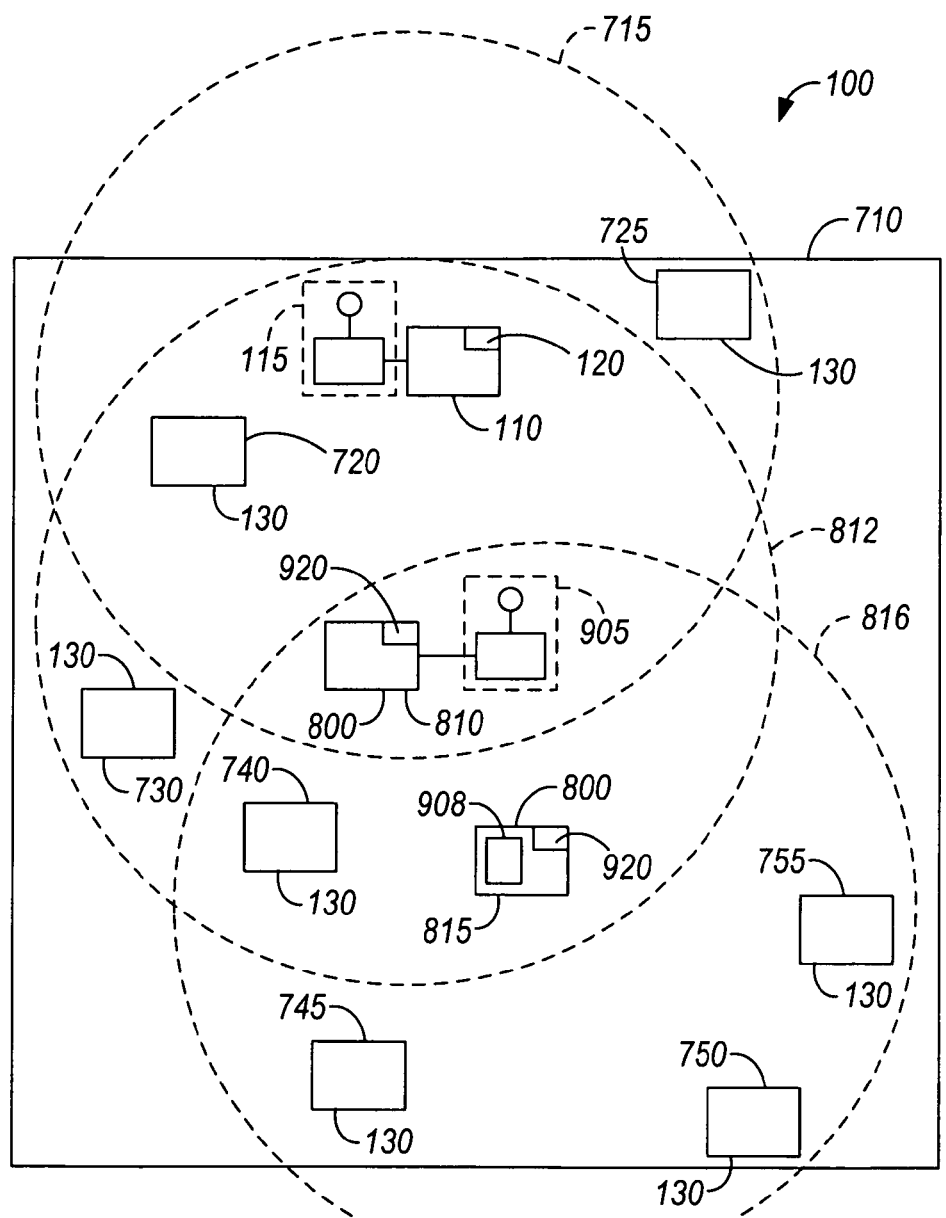
FIG. 7 shows a schematic diagram of a wireless synchronous time keeping system.

For example, in the embodiment illustrated in FIG. 7, the system 100 can be used to synchronize certain devices within a desired area 710. In some constructions, for example, the area 710 can include a building, such as an office building, a school, a department store, a hospital, a hotel, or the like. In other constructions, for example, the area 710 can include multiple buildings, such as a campus.

As shown in FIG. 7, the system 100 includes a primary device 110. In the illustrated embodiment, the primary device 110 is coupled to a receiving unit 115. In some constructions, the receiving unit 115 can receive a GPS time signal or another signal with a time component. In other constructions, the receiving unit 115 can receive a terrestrial signal. In further constructions, the receiving unit 115 can receive another satellite signal.

In the illustrated embodiment, the primary device 110 further includes a transmitting unit 120. The transmitting unit 120 can wirelessly transmit a signal across a first coverage area 715 to one or more secondary devices 130. As shown in FIG. 7, the primary device 110 can transmit signals to a first secondary device 720 and a second secondary device 725, both of which are included in the first coverage area 715. In other constructions, the system 100 can include more or fewer secondary devices 130 within the first coverage area 715 of the primary device 110.

In the illustrated embodiment, the area 710 in which the system 100 operates is larger than the first coverage area 715 of the primary device 110. Furthermore, the system 100 also includes additional secondary devices 130 that are not positioned within the first coverage area 715 of the primary device 110, such as, for example, a third secondary device 730, a fourth secondary device 740, a fifth secondary device 745, a sixth secondary device 750, and a seventh secondary device 755. In some constructions, such as the illustrated embodiment, these additional secondary devices 130 receive signals from the primary device 110 via one or more repeating devices 800.

As shown in FIG. 7, for example, the third secondary device 730 and the fourth secondary device 740 receive signals from the primary device 110 via a first repeating device 810. In this embodiment, the first repeating device 810 is positioned within the first coverage area 715 of the primary device 110 and is equipped to receive signals transmitted from the primary device 110. Furthermore, in some constructions, the first repeating device 810 can be equipped to retransmit the signals to secondary devices 130 within a second coverage area 812. As shown in FIG. 7, the third secondary device 730 and the fourth secondary device 740 are positioned within the second coverage area 812 of the first repeating device 810 and outside the first coverage area 715 of the primary device 110.

Also shown in FIG. 7, the fifth secondary device 745, the sixth secondary device 750, and the seventh secondary device 755 are each positioned outside both the first coverage area 715 of the primary device 110 and the second coverage area 812 of the first repeating device 810. In the illustrated embodiment, these secondary devices 130 receive signals from the primary device 110 via a second repeating device 815 transmitting within a third coverage area 816. As shown in FIG. 7, the second repeating device 815 is positioned within the second coverage area 812 of the first repeating device 810 and outside the first coverage area 715 of the primary device 110.

Figure 8:
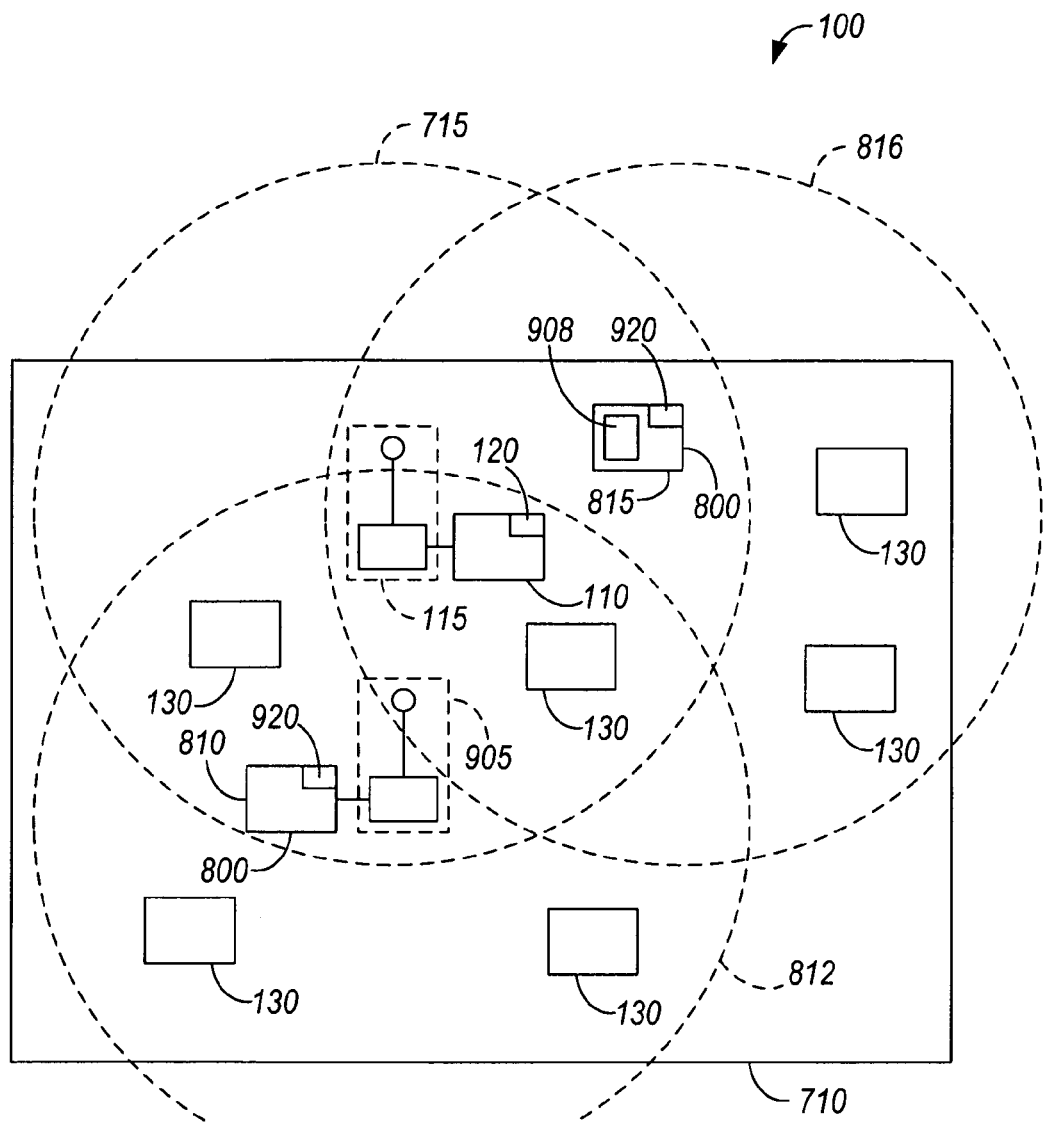
FIG. 8 shows another schematic diagram of a wireless synchronous time keeping system.

Another example of the location of devices within the system 100 is shown in FIG. 8. In this construction, for example, each repeating device 800 can be located within the first coverage area 715 of the primary device 110.

In some constructions, the overlapping regions of the coverage area of the primary device 110 (such as, for example, the first coverage area 715) and the coverage area of a repeating device 800 (such as, for example, the second coverage area 812) can vary for different applications. For example, the system 100 can be used to synchronize various devices 130 within a multi-story building. Even though the primary device 110 may be able to transmit throughout the entire building, repeating devices 800 can be included in order to strengthen the signals from the primary device 110.

In some constructions, as mentioned previously, repeating devices 800 can be equipped to retransmit signals received from the primary device 110 to secondary devices 130 within a particular coverage area. In other constructions, the repeating devices 800 can be equipped to process the signals transmitted by the primary device 110 and transmit processed signals or different signals to the secondary devices 130 within the particular coverage area. For example, a signal sent by the primary device 110 (e.g., the primary signal) may include a time and an instruction. In some constructions, a repeating device 800, such as the first repeating device 810, can process the signal and extract the time information and the instruction. Furthermore, the repeating device 800 can be equipped to modify the instruction, remove the instruction, and/or replace the instruction with a second instruction. Also, in some constructions, the repeating device 800 can modify the time information included in the signal transmitted by the primary device 110 and can transmit updated time information to one or more secondary devices 130. In these constructions, the repeating device 800 can modify the time to reflect instances of daylight savings or time zone changes, for example.

In further constructions, the repeating device 800 can receive a second signal from the primary device 110 on a first frequency. For example, the second signal can include a time and an instruction. A repeating device 800 can receive the second signal, process the second signal and transmit a third signal at a second frequency to another device such as another repeating device 800 or a secondary device 130. The third signal can include the time and the instruction from the second signal or can include one of a modified time and a modified instruction. In some constructions, the first frequency and the second frequency may be the same frequency. The first frequency and the second frequency may also be different frequencies.

Figure 9:
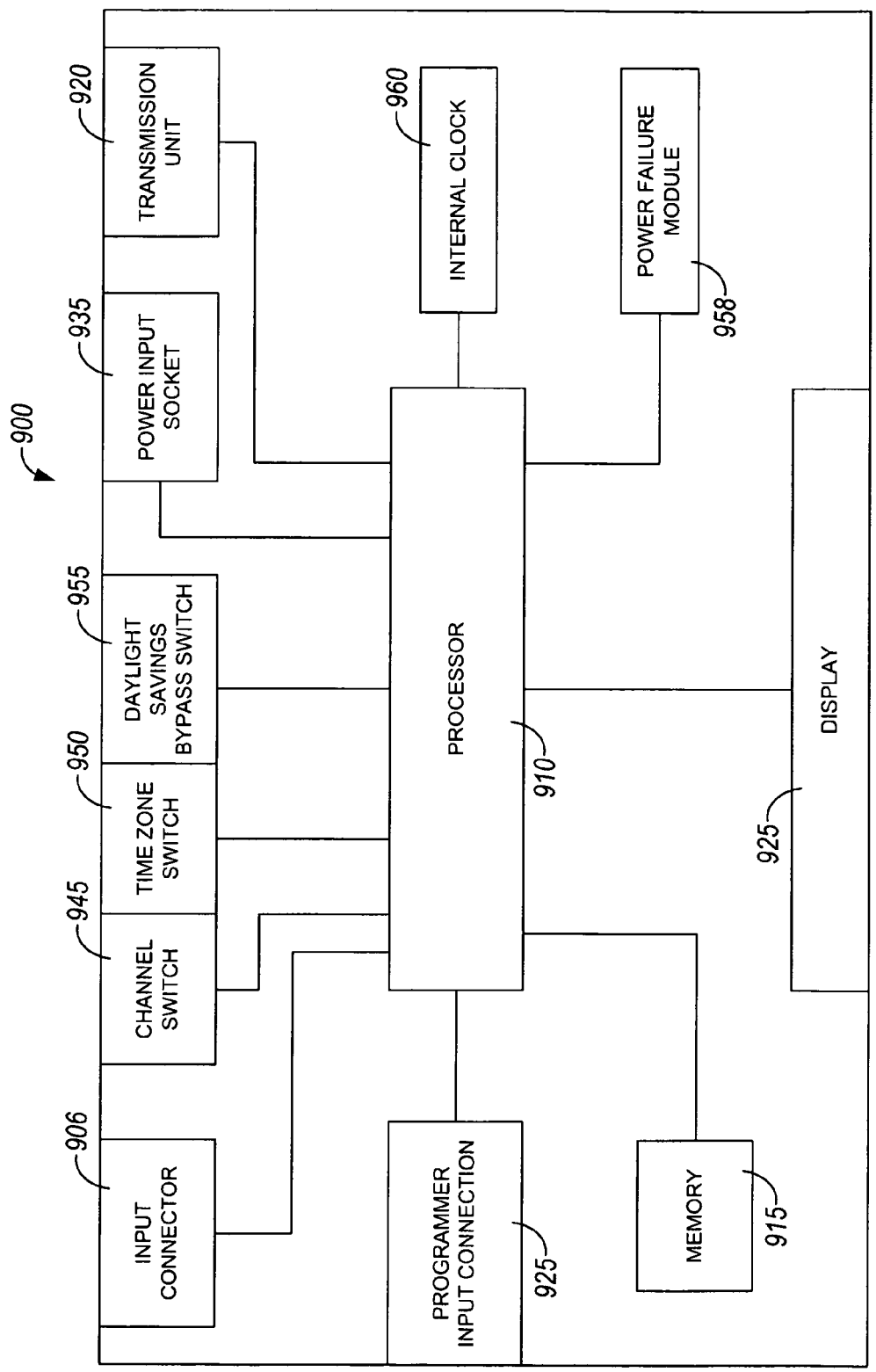
FIG. 9 shows a block diagram of a repeating device for use in a wireless synchronous time keeping system, such as the systems illustrated in FIGS. 7 and 8.
Figure 10:
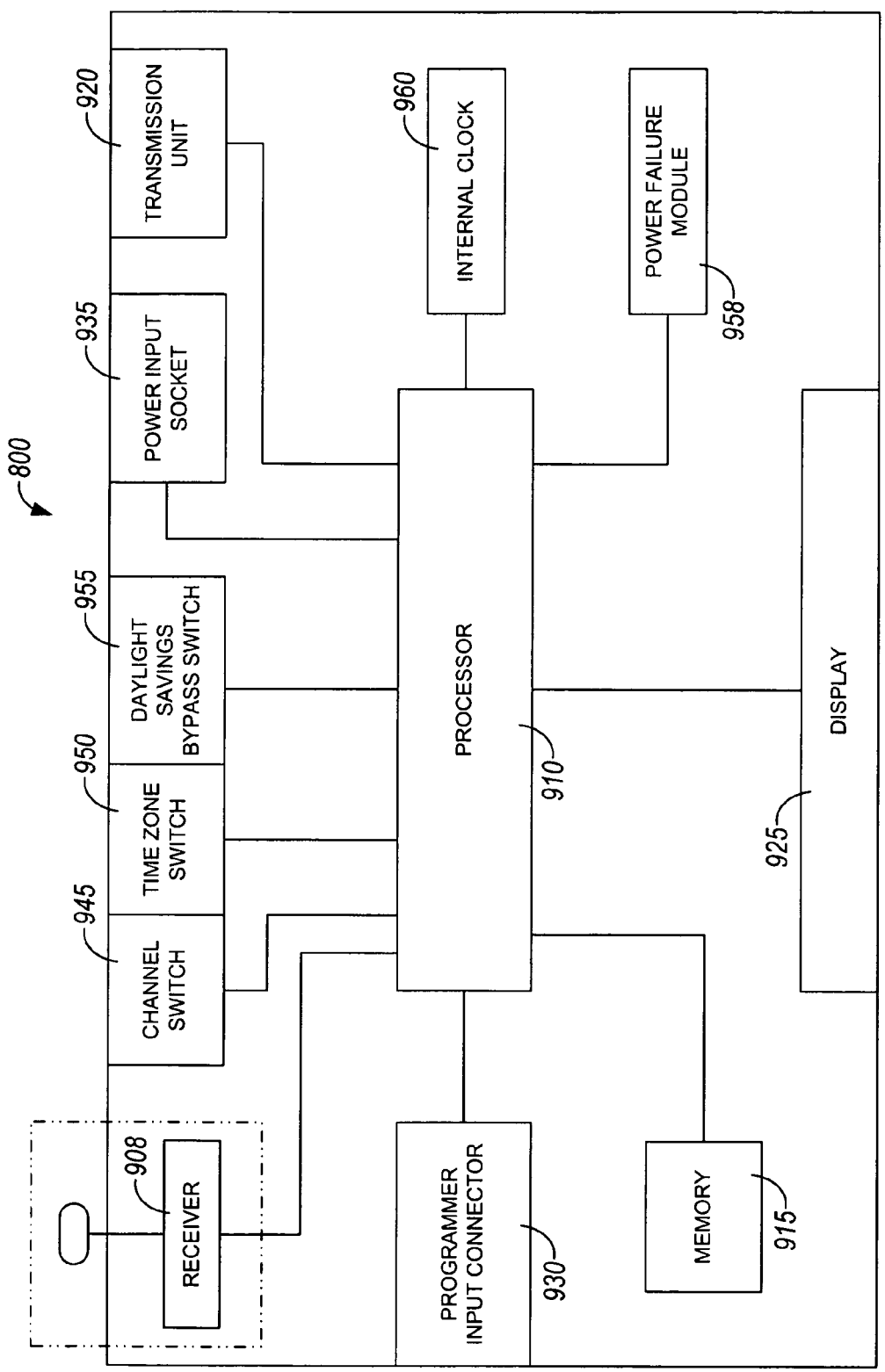
FIG. 10 shows another block diagram of a repeating device for use in a wireless synchronous time keeping system, such as the systems illustrated in FIGS. 7 and 8.

FIGS. 9 and 10 illustrate examples of repeating devices 800 for use in the wireless system 100. In some constructions, such as the constructions illustrated in FIGS. 7, 8 and 9, the repeating device 800 can include components similar to the primary device 110. As shown in the illustrated constructions, the repeating device 800, such as the first repeating device 810, can include an input connector 906 coupling it to an external receiving unit 905. In other constructions, such as the construction shown in FIG. 10, the repeating device 800, such as the second repeating device 815 (shown in FIGS. 7 and 8), can include an internal receiving unit 908.

Similar to the primary device 110, the repeating device 800 can include processor 910, memory 915, a transmission unit 920, a display 925, a programmer input connector 930, a power input socket 935, a channel switch 945, a time zone switch 950, a daylight savings bypass switch 955, a power failure module 958, and an internal clock 960. In some constructions, the repeating device 800 includes fewer modules than those shown and described in FIGS. 9 and 10. In other constructions, the repeating device 800 includes additional modules. In further constructions, the repeating device 800 includes fewer modules than the primary device 110. For example, in one construction, the repeating device 800 may only include an internal receiving unit 906, a processor 910, a memory 915, a transmission unit 920, and an internal clock 960. In still further constructions, the repeating device 800 includes more modules than the primary device 110.

In other constructions, the repeating device 800 may receive an initial reference time signal from an external source, such as a GPS satellite, and may transmit the received time signal to the primary device. For example, the repeating device 800 may be placed outdoors or in another environment that provides a clear and generally unobstructed path for the reception of an initial reference or first signal with a first time component. Upon receiving the first signal, the repeating device 800 may process the first signal, as described above, to produce a second time component. For example, the repeating device 800 may modify the first time component to account for daylight savings or time zones. The repeating device 800 may also transmit the time component of the first signal without processing it. The repeating device 800 transmits a second signal to the primary device 110 that includes the second time component. In some constructions, the repeating device 800 may receive the first signal on a first frequency and may transmit the second signal to the primary device 110 on a second frequency. The second frequency may be a lower frequency that has better material penetration than the first frequency.

Upon receiving the second signal, the primary device 110 may operate as previously described for systems without a repeating device 800. In some constructions, the primary device 110 processes the second signal to produce a third time component and transmits the third time component and a programmed instruction and/or event in a third signal to a secondary device 130. The primary device 110 may also transmit the third signal to a repeating device 800.

Figure 11:
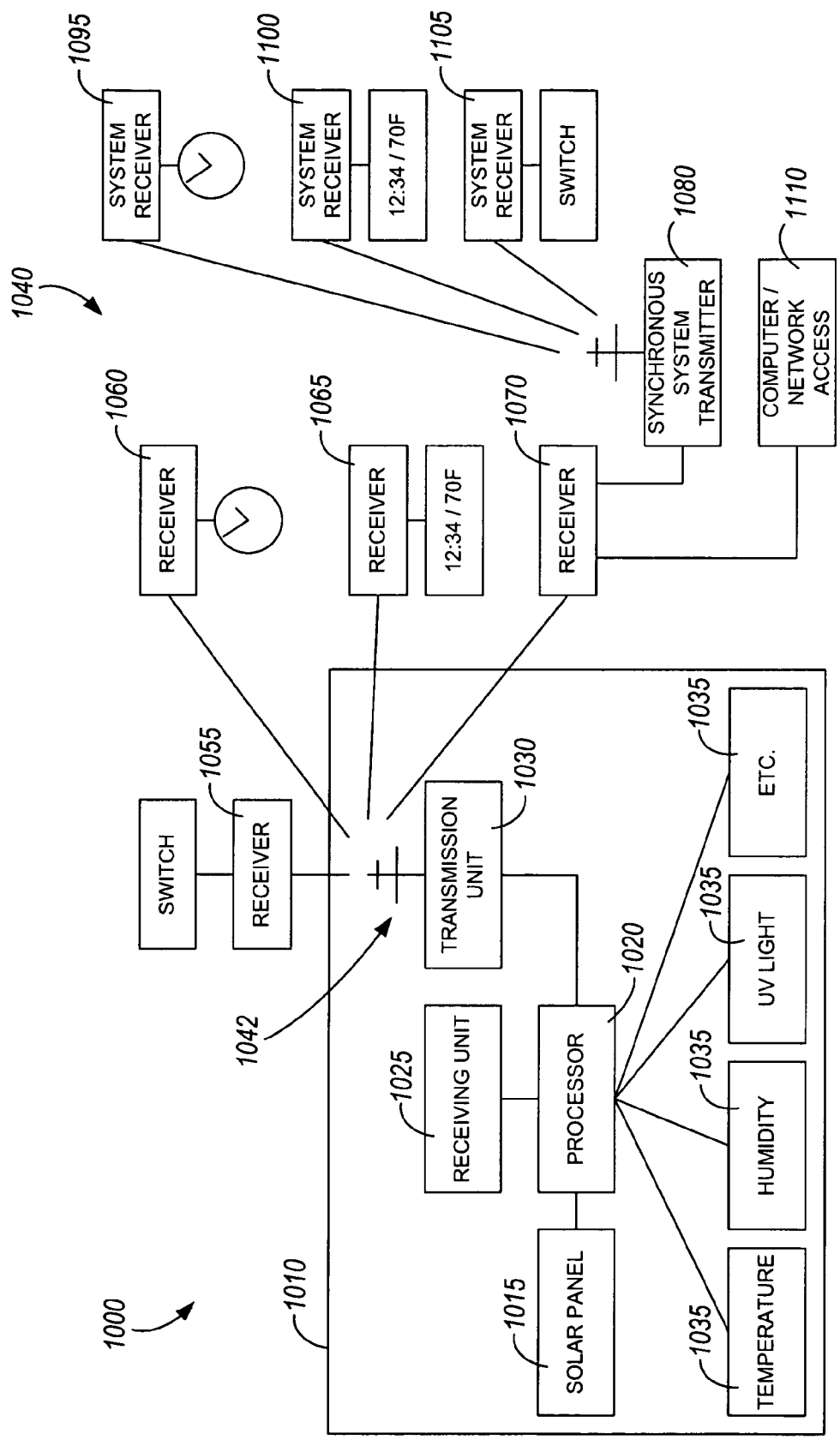
FIG. 11 shows a block diagram of a wireless synchronous time system according to one embodiment of the invention including a transceiver having a solar panel.

In some embodiments, as noted above, the primary device 110 includes a solar panel. FIG. 11 illustrates a wireless synchronous time system 1000 according to one embodiment of the invention. As shown in FIG. 11, the system 1000 includes a primary device or transceiver 1010 that includes a solar panel 1015. In some constructions, such as the constructions illustrated in FIGS. 11, 12, and 13, the transceiver 1010 can include components similar to those of the primary device 110 or the repeating device 800. As shown in the illustrated constructions, the transceiver 1010 includes a receiving unit 1025, a processor 1020, and a transmission unit 1030. In some constructions, the transceiver 1010 includes fewer modules than those shown and described in FIGS. 11, 12, and 13. In other constructions, the transceiver 1010 includes additional modules. For example, in some constructions, the transceiver 1010 can include a display, a programmer input connector, a power input socket, a channel switch, a time zone switch, a daylight savings bypass switch, a power failure module, and/or an internal clock. In further constructions, the transceiver 1010 includes fewer modules than those of the primary device 110 or the repeating device 800. For example, in one construction, the transceiver 1010 only includes a receiving unit 1025, a processor 1020, a memory, a transmission unit 1030, and an internal clock. In still further constructions, the transceiver 1010 includes more modules than those of the primary device 110 or the repeating device 800.

Figure 12:
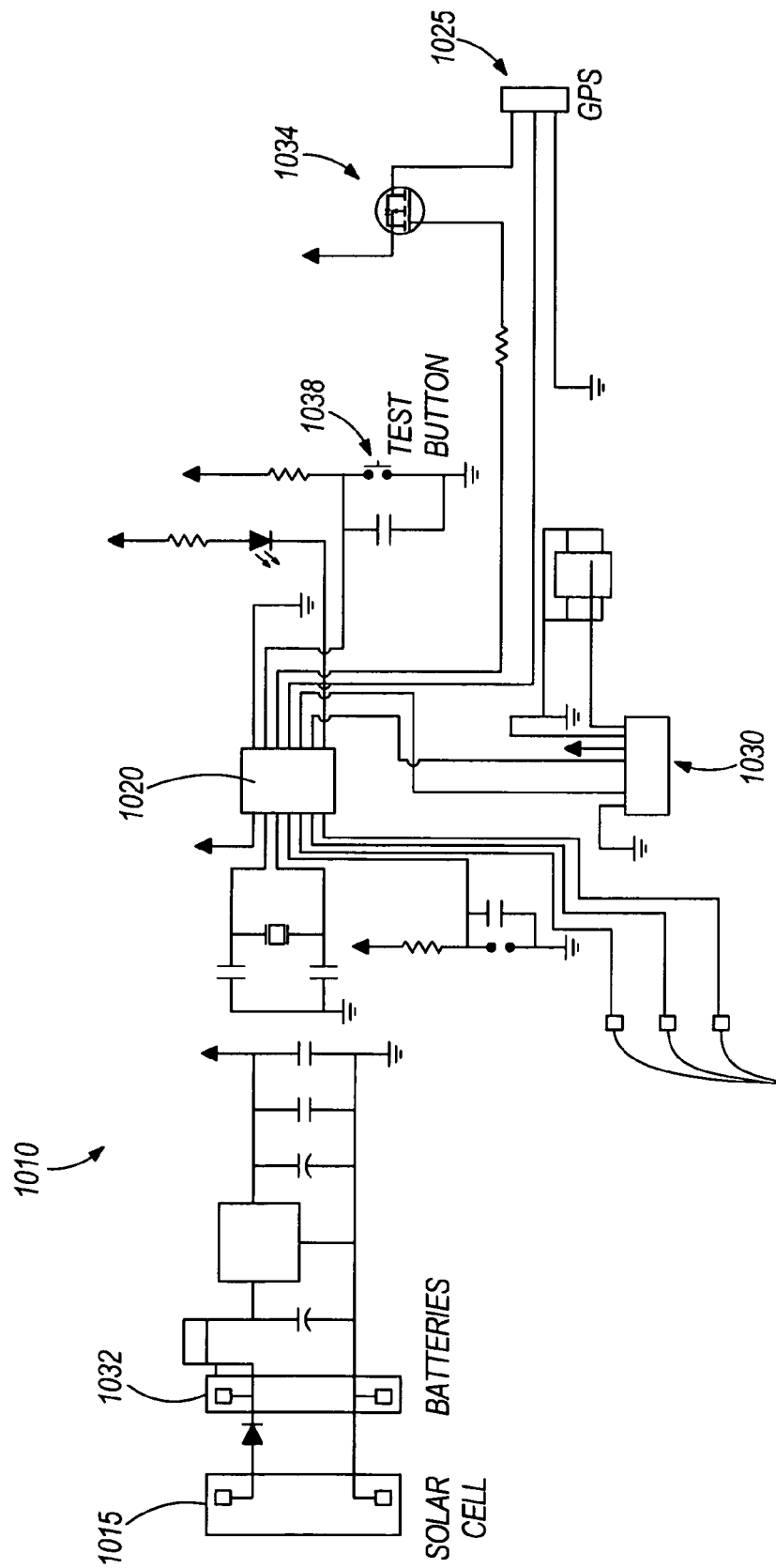
FIG. 12 shows a schematic diagram of the transceiver of FIG. 11 according to one embodiment of the invention.

The solar panel 1015 of the transceiver 1010 includes photoelectric cells that convert light into electricity. As shown in FIGS. 11 and 12, the solar panel 1015 is coupled to the processor 1020 and provides electricity to the processor 1020. The processor 1020 is also coupled to the receiving unit 1025 and the transmission unit 1030 and provides electricity to both units. In some constructions, the solar panel 1015 can be coupled to the receiving unit 1025 and/or the transmission unit 1030 and can provide electricity directly to the units rather than indirectly through the processor 1020.

In some embodiments, the transceiver 1010 also includes a backup power source. For example, as shown in FIG. 12, the transceiver 1010 can include one or more power storage devices 1032 (shown in FIG. 12), such as capacitors or rechargeable batteries, in order to provide power to the processor 1020 and other components of the transceiver 1010 during periods when the solar panel 1015 cannot generate sufficient power. The transceiver 1010 can also include a backup power source that includes an alternating current power source. If desired, the transceiver 1010 can be operated without a backup power source, such as the power storage devices 1032, but the operation of the transceiver 1010 will be intermittent and/or dependent on the availability of adequate light. Power can be conserved by regulating the operation of the transceiver 1010 in order to minimize power consumption by the transceiver 1010.

The power storage devices 1032 can provide power to the processor 1020, the receiving unit 1025, and/or the transmission unit 1030 when the solar panel 1015 cannot provide adequate power (e.g., during periods of low light). The power storage devices 1032 can be rechargeable, and the solar panel 1015 can charge the power storage devices 1032 during periods of sufficient light. In some embodiments, the power storage devices 1032 enable the transceiver 1010 to maintain an internal clock during periods of low light, as described below, to ensure time-synchronized operation of the transceiver 1010 and one or more secondary devices or receivers 1040 (shown in FIG. 11) even during periods of low light.

In some embodiments, when light shines on the solar panel 1015, the solar panel 1015 charges the power storage devices 1032. When a sufficient charge has built up on the power storage devices 1032, power generated by the solar panel 1015 is applied to the processor 1020. As described above, the processor 1020 provides electricity to the receiving unit 1025 and the transmission unit 1030. The receiving unit 1025 uses the electricity provided by the processor 1020 to obtain a signal, such as a GPS signal, and to send signal information to the processor 1020. In some embodiments, the receiving unit 1025 sends a one pulse per second synchronizing pulse and other decoded GPS information to the processor 1020. As shown in FIG. 12, the transceiver 1010 can include an on/off selector or button 1034 that turns on and off the receiving unit 1025.

The processor 1020 transmits a time signal and/or additional information to the receivers 1040 using the transmission unit 1030. In some embodiments, the processor 1020 also uses the information provided from the receiving unit 1025 to synchronize an internal clock as described above with respect to the primary device 110. In other embodiments, the processor 1020 transmits a time signal and/or additional information to the receivers 1040 without synchronizing an internal clock of the transceiver 1010. For example, the processor 1020 can transmit a time signal to a receiver 1040 that includes a primary device 110. The primary device 110 can set an internal clock and can transmit a first internal time to one or more secondary devices 130 as described above.

As shown in FIGS. 11 and 12, the transceiver 1010 can also include one or more sensors 1035. In some embodiments, the sensors 1035 can detect environmental conditions, such as temperature, wind speed and/or direction, humidity, ultraviolet light conditions, pollution conditions, and atmospheric pressure. In some constructions, the transceiver 1010 can process the detected signals and produce condition signals that provide information, such as weather information at the location of the sensors (i.e., the location of the transceiver 1010). The transceiver 1010 can also transmit the condition signals to the receivers 1040 for further processing, as described below. If time information maintained by the transceiver 1010 is combined with condition signals, then, in some embodiments, past detected environmental conditions can be combined and analyzed with present detected environmental conditions in order to predict or forecast future environmental or weather conditions. If location information maintained by the transceiver 1010 (e.g., preprogrammed in a memory of the transceiver 1010 or obtained from a GPS signal) is also combined with the environmental conditions and time information, then, in some embodiments, the environmental conditions from one location can be combined with environmental conditions for other locations and can create an environmental or weather picture, which indicates current environmental or weather conditions throughout a particular region. The weather picture can enable the tracking of environment and weather events, and, in some embodiments, can improve weather forecasting.

In some embodiments, the processor 1020 of the transceiver 1010 can execute one or more self-diagnostic tests. Such a test can be automatically initiated by the transceiver 1010 or can be initiated by a signal received by the receiving unit 1025 of the transceiver 1010. For example, a receiver 1040 can trigger the execution of a self-diagnostic test by transmitting a request to the transceiver 1010 that is received by the receiving unit 1025. The transceiver 1010 can also include a test selector or button 1038 (FIG. 12) that an individual can press in order to initiate the execution of the self-diagnostic test.

The processor 1020 of the transceiver 1010 can execute the self-diagnostic test and can generate one or more test results. The test results can include a current status of the transceiver 1010. In some embodiments, the transceiver 1010 includes a display or other output (e.g., a printing device) that provides the test results or a portion thereof. The transceiver 1010 can also transmit the test results or a portion thereof to one or more of the receivers 1040. The receivers 1040 can record or log the test results, provide the test results on a display or other output, and/or perform further processing of the test results. In some embodiments, each receiver 1040 can perform a similar self-diagnostic test and can forward test results to the transceiver 1010 or other receivers 1040.

The receiving unit 1025 of the transceiver 1010 can include a receiver having an antenna 1042 that receives signals, such as low power, high frequency signal information transmitted from GPS satellites. In some embodiments, the transceiver 1010 can be placed in an area where low power, high frequency signals can be received, such as outdoors. The transceiver 1010 then wirelessly transmits the signals, or a variation thereof, to the receivers 1040. By selecting an appropriate Federal Communications Commission ("FCC") frequency and power for the retransmission of the signal information, the retransmitted information can penetrate buildings and other solid structures, thus making the original signal information (i.e., the satellite signal information) available in areas where the original signals could otherwise not penetrate (e.g., inside buildings) and effectively extending the range of the low power, high frequency signal.

Furthermore, as described above, the transceiver 1010 can use the received signals to add Coordinated Universal Time (UTC) and GPS location information to sensor readings (e.g., detected environmental conditions) before transmitting data to the receivers 1040. In some embodiments, the addition of time and location information to environmental conditions can be used for weather tracking and/or forecasting.

In some embodiments where greater timing precision is beneficial, the processor 1020 of the transceiver 1010 can compensate for processing and transmission delays between the transceiver 1010 and a receiver 1040 by adding processing delay information to the data transmitted by the transceiver 1010. For example, the processor 1020 of the transceiver 1010 can determine a transmission delay (e.g., the time needed to receive the signal from the receiving unit 1025) by starting a transmission delay count upon receiving the start of a one pulse per second output from the receiving unit 1025 and continuing counting until the complete reception of time information from the receiving unit 1025. The processor 1020 can then transmit the transmission delay count (e.g., 0.5 seconds) and the time information (e.g., 4:00:00.0) to the receivers 1040. The receivers 1040 can set an internal clock to the value of the time information plus one second (e.g., 4:00:01.0). Without accounting for the transmission delay count, the receivers 1040 would start incrementing the internal time one second after obtaining the time information (e.g., 4:00:01.0). To account for the transmission delay count, however, the receivers 1040 start incrementing the internal clock one second minus the transmission count after receiving the time information (e.g., 4:00:00.5). In another embodiment, the processor 1020 of the transceiver 1010 can increment the time information in the data stream by one second and synchronize the transmission of the incremented data with the next one pulse per second time synchronization pulse from the receiving unit 1025.

The transceiver 1010 can also compensate for location differences between the location of the transceiver 1010 and the location of the receivers 1040. For example, the transceiver 1010 can add a transmission delay (e.g., the time it will take for a signal transmitted by the transceiver 1010 to be received by a receiver 1040) to the time information in order to provide a more accurate time signal to a receiver 1040. The transceiver 1010 can also adjust the time information based on a time zone associated with a receiver 1040 or the occurrence of a daylight savings event. By receiving the adjusted time information from the transceiver 1010, a receiver 1040 can generally more accurately synchronize an internal clock or perform other synchronized events or processing.

As described above, the transmission unit 1030 wirelessly transmits a signal to the receivers 1040. In one embodiment, the signal sent to the receivers 1040 includes the processed GPS time signal component. The signal sent to the receivers 1040 can also include other information, such as condition signals generated by the sensors 1035, test results generated by the processor 1020 executing a self-diagnostic test, location information stored by the transceiver 1010 or obtained from the GPS signal, and/or a programmed instruction including a preprogrammed time element and a preprogrammed function element as described above with respect to the primary device 110. Communication between the receivers 1040 and the transceiver 1010 can use one-way or two-way radio frequency ("RF") systems. In some embodiments, the receivers 1040 and the transceiver 1010 use amplitude modulation RF systems to communicate. In other embodiments, the receivers 1040 and the transceiver 1010 use frequency modulation RF systems to communicate. In some embodiments, the processed GPS time signal component and any additional information is wirelessly transmitted to the receivers 1040 at approximately a frequency between 72 and 76 MHz. In another construction, the processed GPS time signal component and any additional information is wirelessly transmitted to the receivers 1040 at a frequency of approximately 154 MHz.

The transceiver 1010 can transmit information (e.g., the processed time component, location information, weather information, test results, etc.) as separate transmissions. The transceiver 1010 can also transmit the information in one or more data packets that combines different data. For example, the transceiver 1010 can transmit the processed time component and the weather information in a single data packet. In some embodiments, the processor 1020 of the transceiver 1010 can also accumulate, summarize, and/or analyze the data before the data is transmitted to a receiver 1040.

Once the processor 1020 of the transceiver 1010 has obtained, processed, packaged, etc. data obtained by the receiving unit 1025, the sensors 1035, the self-diagnostic test, etc., the transmission unit 1030 transmits the information to the receivers 1040.

FIG. 11 illustrates a number of examples of receivers 1040. In some constructions, such as the construction illustrated in FIG. 13, the receivers 1040 can include components similar to those of the primary device 110, the secondary devices 130, or the repeating device 800 as described above with respect to FIGS. 1-10. In some constructions, a receiver 1040 can include fewer modules than those of the primary device 110, the secondary devices 130, or the repeating device 800. For example, in the construction illustrated in FIG. 13, a receiver 1040 only includes a receiving unit 1045, a processor 1050, a memory, and an internal clock. In still further constructions, a receiver 1040 can include more modules than those of the primary device 110, the secondary device 130, or the repeating device.

As shown in FIG. 11, examples of receivers 1040 include a receiver with an event switch 1055, a receiver with an analog time display 1060, a receiver with a digital display 1065, a receiver coupled to a synchronous system transmitter 1070, and a receiver with a port 1075. As also shown in FIG. 11, a receiver 1040 can transmit information received from the transceiver 1010 to a secondary receiver. For example, the receiver coupled to a synchronous system transmitter 1070 can include a synchronous system transmitter 1080, which can transmit information received by the receiver 1070 to one or more system receivers 1090. For example, as shown in FIG. 11, the synchronous system transmitter 1080 can transmit information to a system receiver with an analog time display 1095, a system receiver with a digital display 1100, and a system receiver with an event switch 1105.

Figure 13:
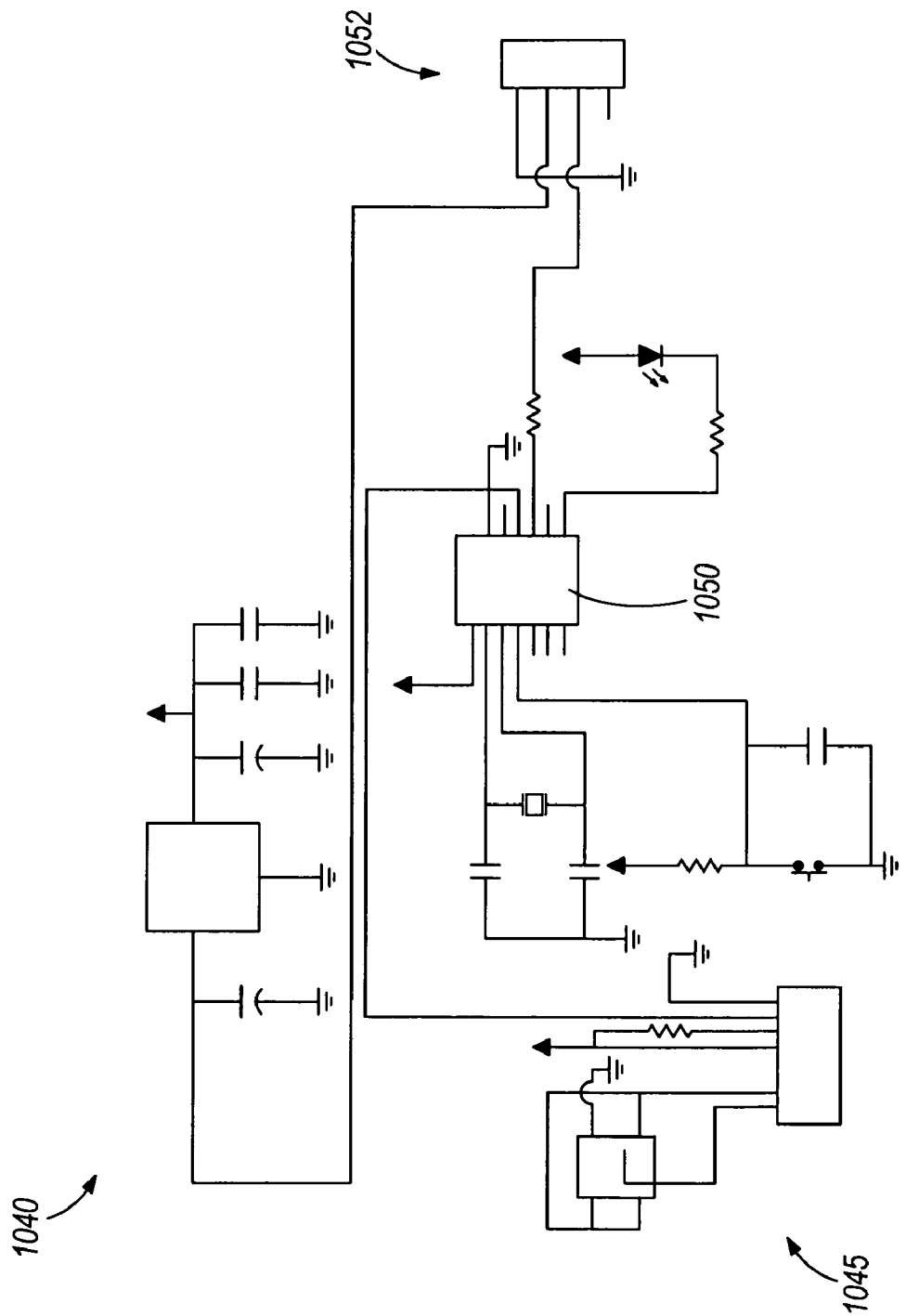
FIG. 13 shows a schematic diagram of a receiver included in the wireless synchronous time system of FIG. 1 according to one embodiment of the invention.

As shown in FIG. 13, a receiver 1040 can also include a communication port or connector 1052 that allows the receiver 1040 to be connected to an external device or network. For example, the receiver with a port 1075 can include a port 1052 usable to connect the receiver 1075 with a computer network 1110, such as a local area network ("LAN"). The receiver 1075 can also be connected to other external devices, such as a monitor, a printing device, a personal computer, a database, a keyboard, etc. In some embodiments, the transceiver 1010 can include a communication port or connector that allows the transceiver 1010 to be connected to an external device or network.

Receivers 1040 with analog displays (e.g., the receiver with an analog time display 1060) can receive time information from the transceiver 1010, synchronize an internal time with the time information, and display the time information. Receivers 1040 with a digital display (e.g., the receiver with a digital display 1065) can also synchronize an internal time with the transmitted time information and display the time. In addition, receivers 1040 with a digital display can display other information, such as environmental condition signals or test results, received from the transceiver 1010. Other receivers 1040 with transmitters, event switches, or other devices can receive, send, process, analyze, record, and/or retransmit part or all of the data received from the transceiver 1010.

Each receiver 1040 includes a receiving unit 1045 including an antenna to wirelessly receive signals from the transceiver 1010, such as, for example, the processed GPS time signal component, location information, and environmental condition signals. In some embodiments, as described above, the transceiver 1010 can also transmit a programmed instruction with a preprogrammed time element and a preprogrammed function element. As shown in FIG. 13, a receiver 1040 can include a processor 1050 to process the processed time signal, the location information, the condition signals, the diagnostic test results, and/or the programmed instruction received from the transceiver 1010. In some embodiments, the processor 1050 can execute the preprogrammed function element of a programmed instruction when the preprogrammed time element of the programmed instruction matches a second time generated by the receiver 1040. Executing the programmed function element performs a particular event, such as sounding a bell, displaying a time, displaying a date, displaying environmental conditions (e.g., weather information), displaying a status of the transceiver 1010, displaying a status of a receiver 1040, displaying a message, locking a door, etc.

Figure 14:
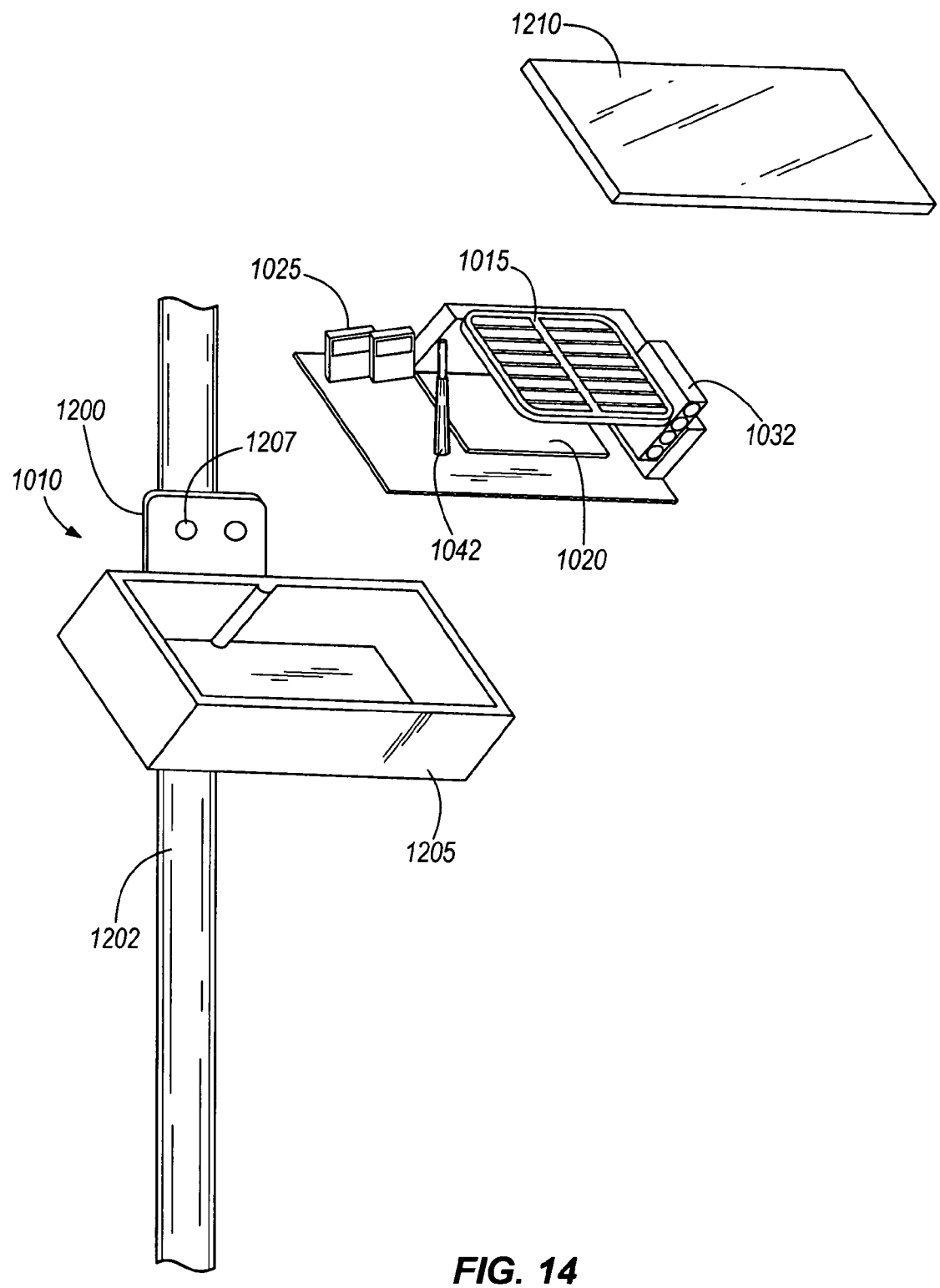
FIG. 14 shows a mounting assembly of the transceiver of FIG. 11 according to one embodiment of the invention.

As shown in FIG. 14, to mount the transceiver 1010 in a location, the transceiver 1010 can be attached to a mounting bracket 1200. The bracket 1200 can have a portion angled at approximately 40° in order to mount the transceiver 1010 at generally a 320° angle with respect to a horizontal reference line (e.g., the horizon). Mounting the transceiver 1010 at such an angle can help prevent or eliminate snow or debris that may accumulate on the surface of the transceiver 1010. Mounting the transceiver 1010 at such an angle can also place the solar panel 1015 at a position for receiving light when the sun is lower on the horizon. In some embodiments, the transceiver 1010 is mounted such that the solar panel 1015 faces south. The mounting bracket 1200 can be mounted to a pole or other substantially stationary fixture 1202.

As also shown in FIG. 14, the transceiver 1010 includes a case bottom 1205, which can be mounted to the bracket 1200 using hardware 1207, such as nails, screws, or other fasteners. In some embodiments, the bracket 1200 and the case bottom 1205 are one component. The transceiver 1010 also includes a top 1210, which is generally transparent to allow the solar panel 1015 to receive light.

The transceiver 1010 and the receivers 1040 as shown and described in FIGS. 11, 12, and 13 can be used in many ways in many types of systems. For example, the transceiver 1010 can be used as a transmitter in a synchronous clock system, or the transceiver 1010 can serve as a wireless data collection center supplying precision time and other data (e.g., environmental conditions) from a first location (e.g., an outdoor GPS unit location) to a second location (e.g., an indoor transmitter) for retransmission. Furthermore, although GPS information has been discussed above, any precision time signal broadcast, such as a WWVB signal, may be used for obtaining time information. Other global positioning systems can also be used for obtaining location information.

Although the invention has been described in detail with reference to certain embodiments, variations and modifications exist within the scope and spirit of the invention as described and defined in the following claims.

The invention claimed is:

1. A primary device for a synchronous event system involving the primary device and at least one secondary device whose operation is at least in part dependent on information transmitted by the primary device, the primary device comprising:
   at least one sensor operable to detect at least one environmental condition and to produce a condition signal based on the at least one environmental condition;
   a receiver operable to receive a global positioning system time signal;
   a processor coupled to the receiver and operable to process the global positioning system time signal to produce a processed time component;
   an internal clock coupled to the processor and operable to store the processed time component and to increment relative to the processed time component thereafter to produce an internal time; and
   a transmitter coupled to the processor and operable to transmit the internal time and the condition signal to a secondary device for at least wireless reception by the secondary device and synchronization of the secondary device relative to the primary device.

2. The primary device of claim 1, further comprising a solar panel operable to convert light to electricity.

3. The primary device of claim 2, wherein the solar panel is further operable to provide at least a portion of the electricity to at least one of the receiver, the processor, the internal clock, and the transmitter.

4. The primary device of claim 2, further comprising at least one power storage device.

5. The primary device of claim 4, wherein the at least one power storage device is operable to be charged by the electricity.

6. The primary device of claim 2, wherein the at least one power storage device is operable to provide power to at least one of the receiver, the processor, the internal clock, and the transmitter.

7. The primary device of claim 1, wherein the processor is further operable to package the first internal time and the condition signal in a combined signal.

8. The primary device of claim 1, wherein the processor is further operable to adjust the global positioning system time signal based on a time zone adjustment.

9. The primary device of claim 1, wherein the processor is further operable to adjust the global positioning system time signal based on a daylight savings time adjustment.

10. The primary device of claim 1, further comprising a memory coupled to the processor and operable to store a programmed instruction including a time element.

11. The primary device of claim 10, wherein the transmitter is further operable to transmit the programmed instruction to the secondary device for at least wireless reception and execution of the programmed instruction by the secondary device.

12. The primary device of claim 1, further comprising a display operable to display the internal time.

13. The primary device of claim 1, wherein the processor is further operable to process the global positioning system time signal to produce a processed location component.

14. The primary device of claim 13, wherein the transmitter is further operable to transmit the processed location component to the secondary device.

* * * * *